United States Patent [19]

(12) United States Patent (10) Patent No.: US 9,894,353 B2
Li et al. (45) Date of Patent: Feb. 13, 2018

(54) METHOD AND APPARATUS FOR ENCODING AND DECODING VIDEO USING INTRA PREDICTION MODE DEPENDENT ADAPTIVE QUANTIZATION MATRIX

(75) Inventors: Jin Li, Singapore (SG); Chong Soon Lim, Singapore (SG); Viktor Wahadaniah, Singapore (SG); Sue Mon Thet Naing, Singapore (SG); Hai Wei Sun, Singapore (SG); Hisao Sasai, Osaka (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 292 days.

(21) Appl. No.: 14/125,753

(22) PCT Filed: Jun. 12, 2012

(86) PCT No.: PCT/JP2012/003814
§ 371 (c)(1),
(2), (4) Date: Dec. 12, 2013

(87) PCT Pub. No.: WO2012/172779
PCT Pub. Date: Dec. 20, 2012

(65) Prior Publication Data
US 2014/0105283 A1 Apr. 17, 2014

Related U.S. Application Data

(60) Provisional application No. 61/496,122, filed on Jun. 13, 2011.

(51) Int. Cl.
*H04N 19/129* (2014.01)
*H04N 19/124* (2014.01)
(Continued)

(52) U.S. Cl.
CPC ......... *H04N 19/0009* (2013.01); *H04N 19/11* (2014.11); *H04N 19/124* (2014.11); *H04N 19/126* (2014.11); *H04N 19/129* (2014.11); *H04N 19/157* (2014.11); *H04N 19/159* (2014.11); *H04N 19/176* (2014.11); *H04N 19/625* (2014.11)

(58) Field of Classification Search
CPC ....... H04N 19/00109; H04N 19/00218; H04N 19/0009
See application file for complete search history.

(56) References Cited

U.S. PATENT DOCUMENTS 4,734,767 A * 3/1988 Kaneko ............... H04N 19/176
348/400.1
2008/0285644 A1* 11/2008 Seo ..................... H04N 19/159
375/240.2

(Continued)

FOREIGN PATENT DOCUMENTS

WO 2010/146772 12/2010

OTHER PUBLICATIONS

Inteational Search Report dated Sep. 4, 2012 in corresponding International (PCT) Application No. PCT/JP2012/003814.
(Continued)

*Primary Examiner* — Jamie Atala
*Assistant Examiner* — Hesham Abouzahra
(74) *Attorney, Agent, or Firm* — Wenderoth, Lind & Ponack, L.L.P.

(57) ABSTRACT

A method of encoding video using intra prediction mode dependent quantization matrix includes: calculating an array of quantizers for each size of block unit (100); encoding the arrays of quantizers into header of compressed video stream (102); selecting one scanning order based on a selected intra prediction mode among a plurality of scanning orders (112); scanning the array of quantizers to obtain a block of quantizers based on the selected scanning order (114).

8 Claims, 34 Drawing Sheets

(51) Int. Cl.
    *H04N 19/159*     (2014.01)
    *H04N 19/11*     (2014.01)
    *H04N 19/126*     (2014.01)
    *H04N 19/157*     (2014.01)
    *H04N 19/176*     (2014.01)
    *H04N 19/625*     (2014.01)

(56) References Cited

U.S. PATENT DOCUMENTS

2009/0257489 A1* 10/2009 Karczewicz ......... H04N 19/126
    375/240.03
2011/0206289 A1* 8/2011 Dikbas ............. H04N 19/00484
    382/238
2012/0093427 A1 4/2012 Itani et al.

OTHER PUBLICATIONS

ITU-T Recommendation H.264, "Advanced video coding for generic audio visual services", Mar. 2010.

Zheng, J. et al., "Adaptive frequency weighting quantization", Joint Collaborative Team on Video Coding (JCT-VC) of ITU-T SG16 WP3 and ISO/IEC JTC1/SC29/WG11, 1st meeting, Dresden, DE, Document JCTVC-A028, Apr. 2010.

Zheng, Y. et al., "CE11: Mode Dependent Coefficient Scanning", Joint Collaborative Team on Video Coding (JCT-VC) of ITU-T SG16 WP3 and ISO/IEC JTC1/SC29/WG11, 4th meeting: Daegu, KR, Document JCTVC-D393, Jan. 2011.

\* cited by examiner

[Fig. 1]
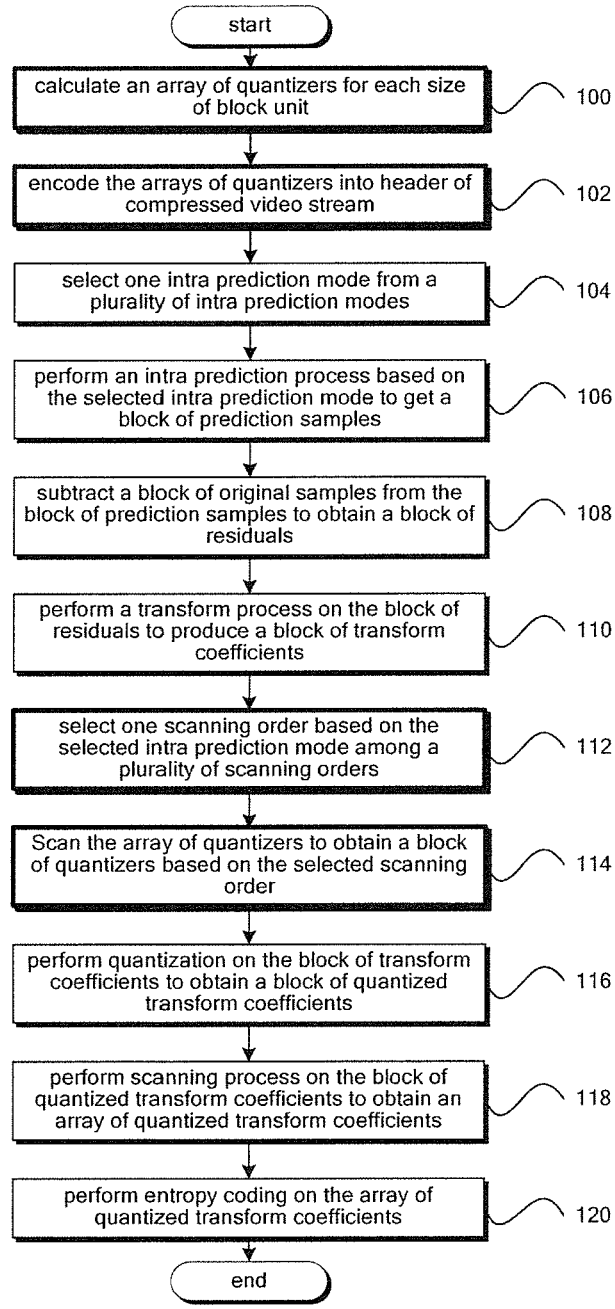

[Fig. 2]
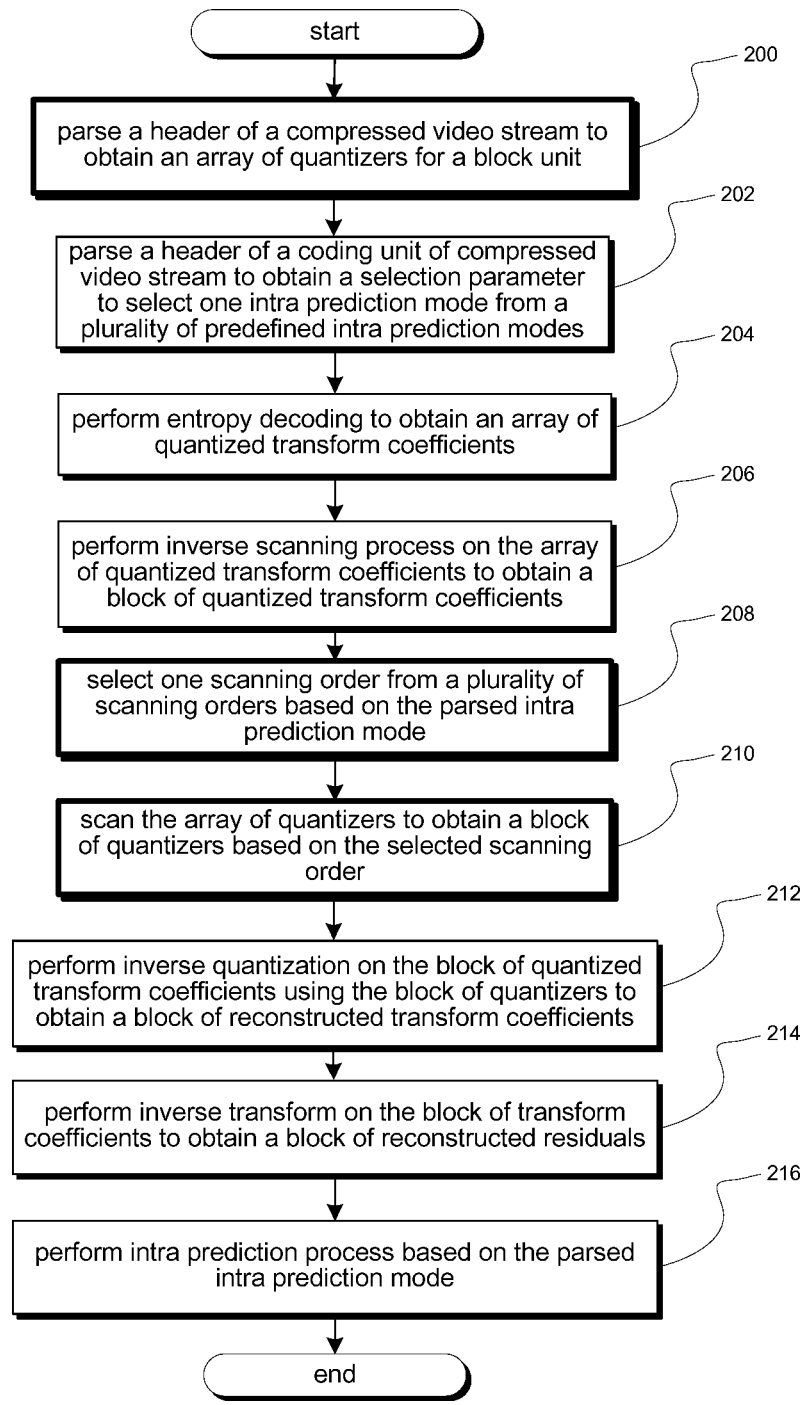

[Fig. 3]
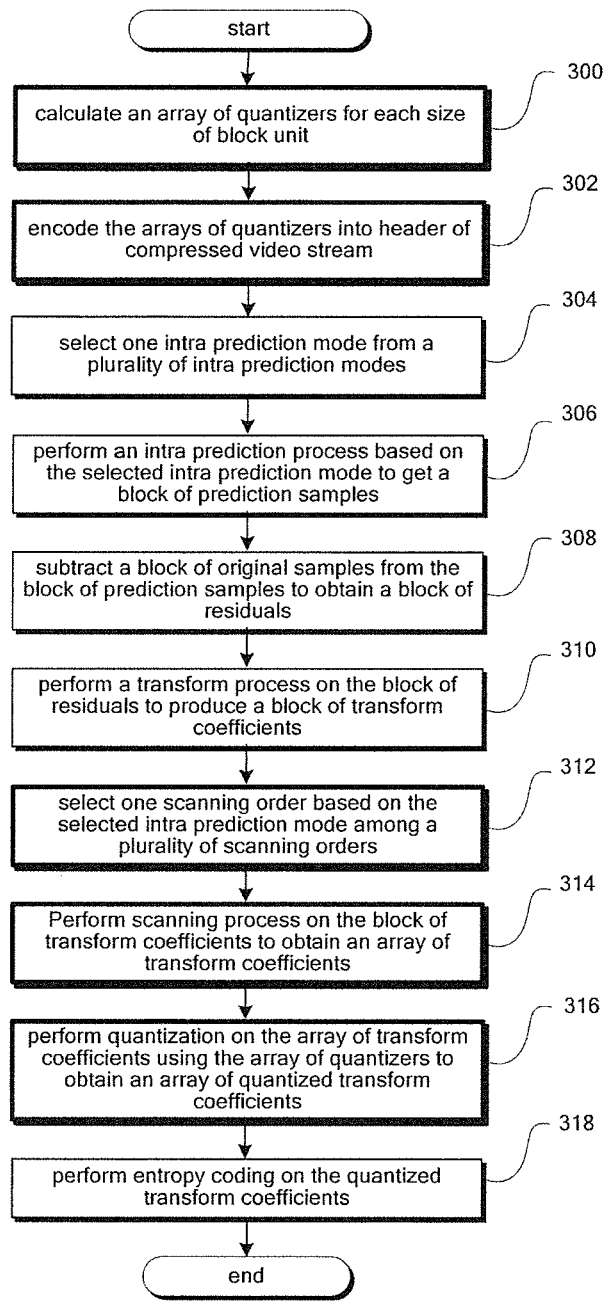

[Fig. 4]
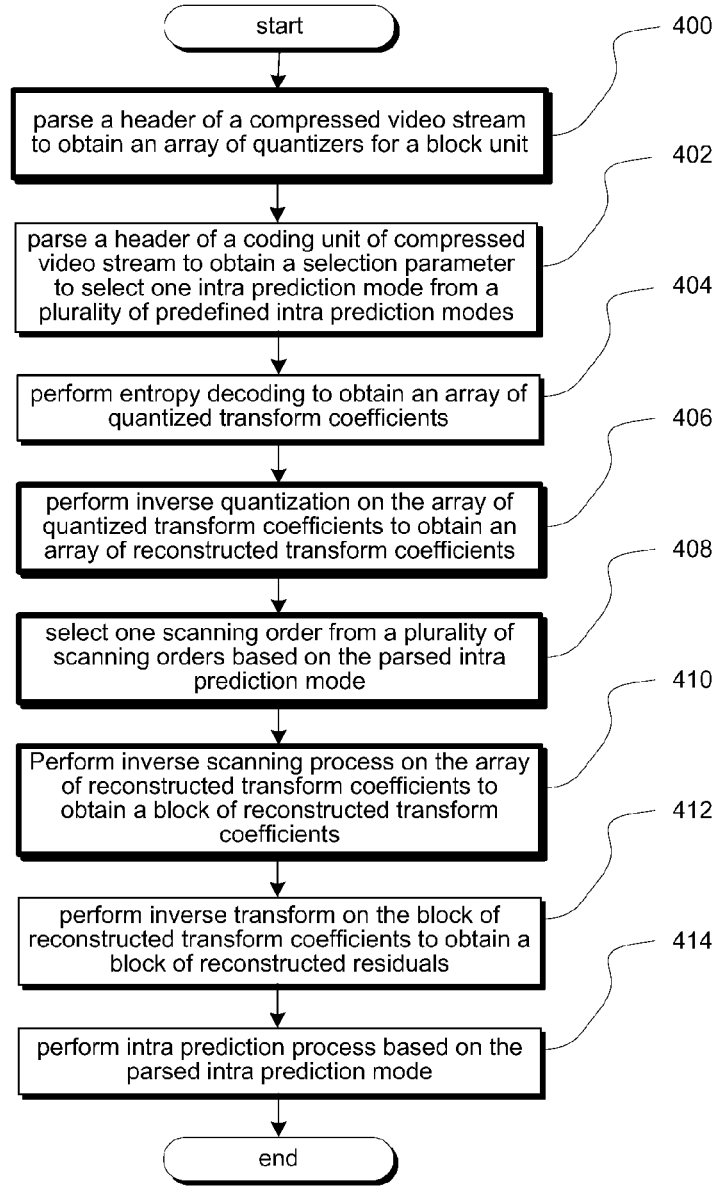

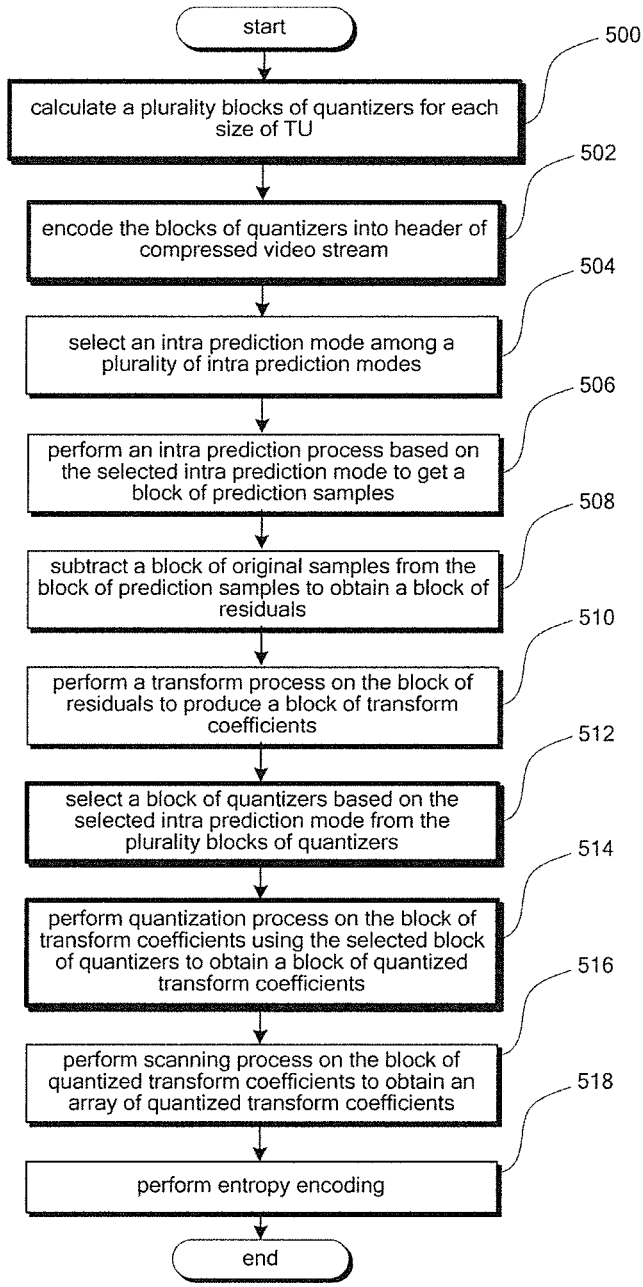
[Fig. 5]

[Fig. 6]
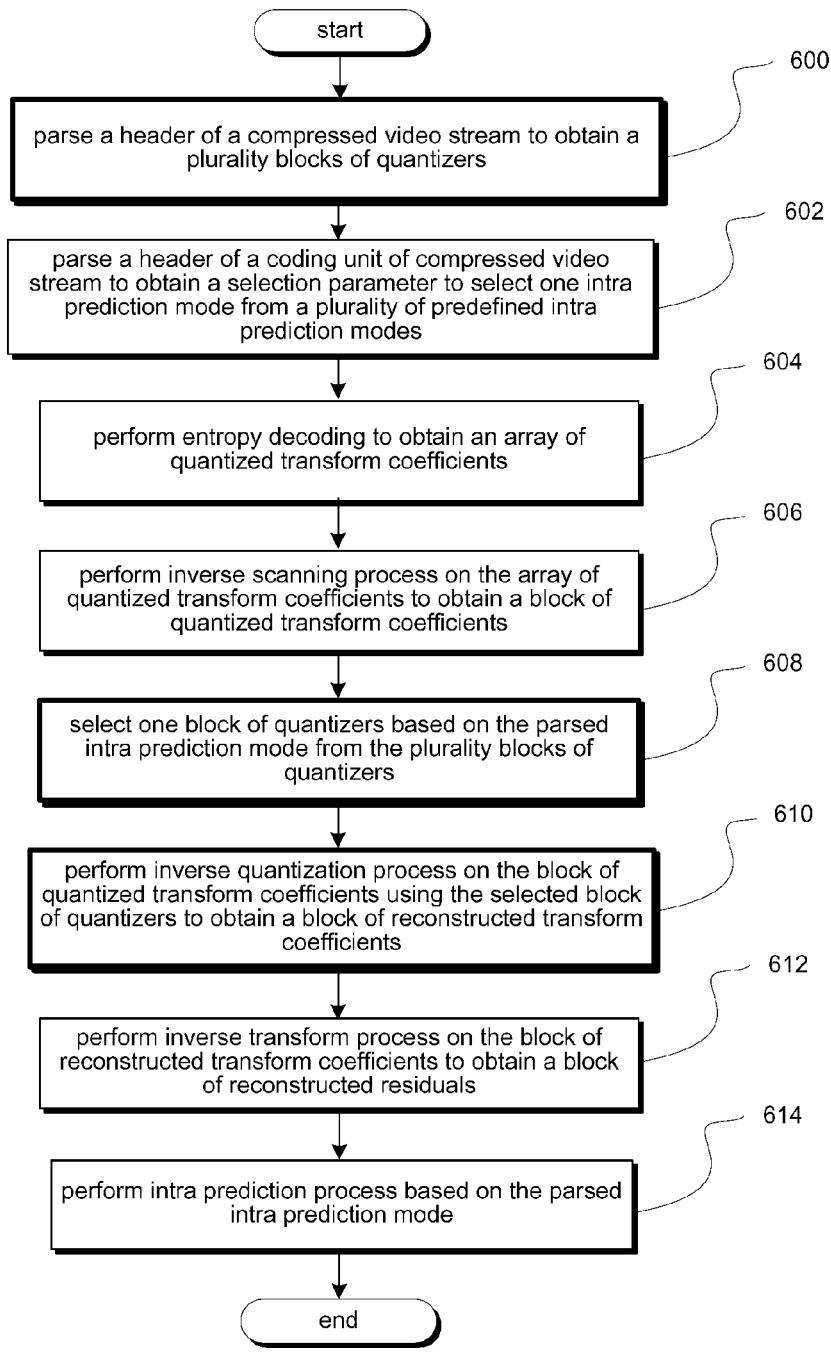

[Fig. 7]
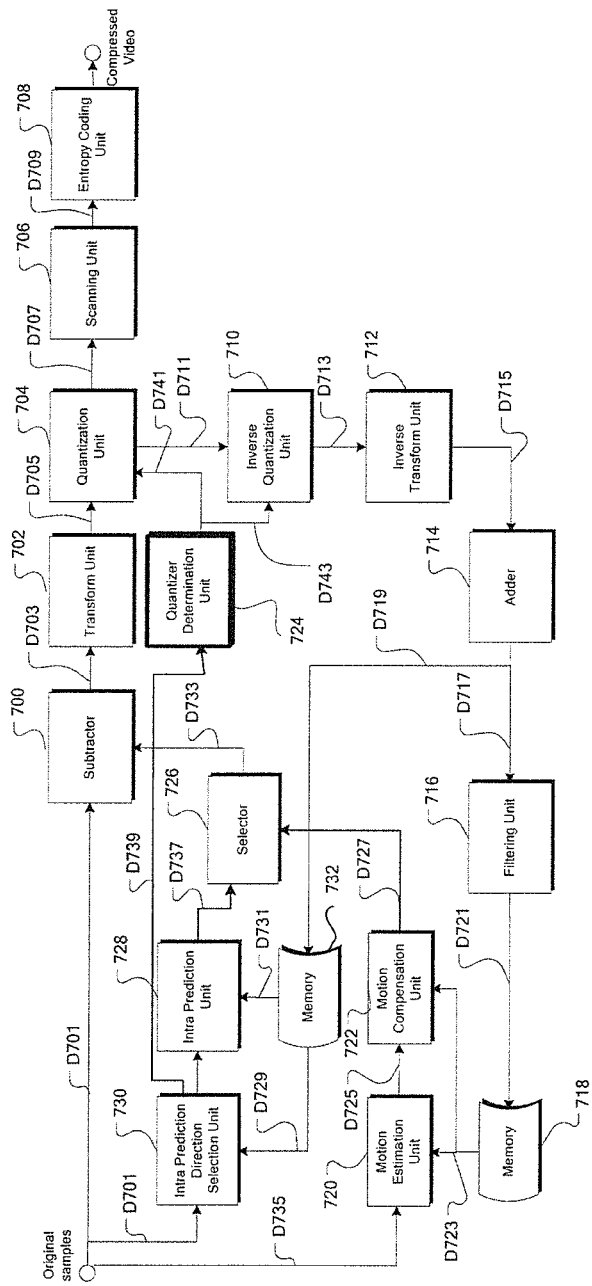

[Fig. 8]
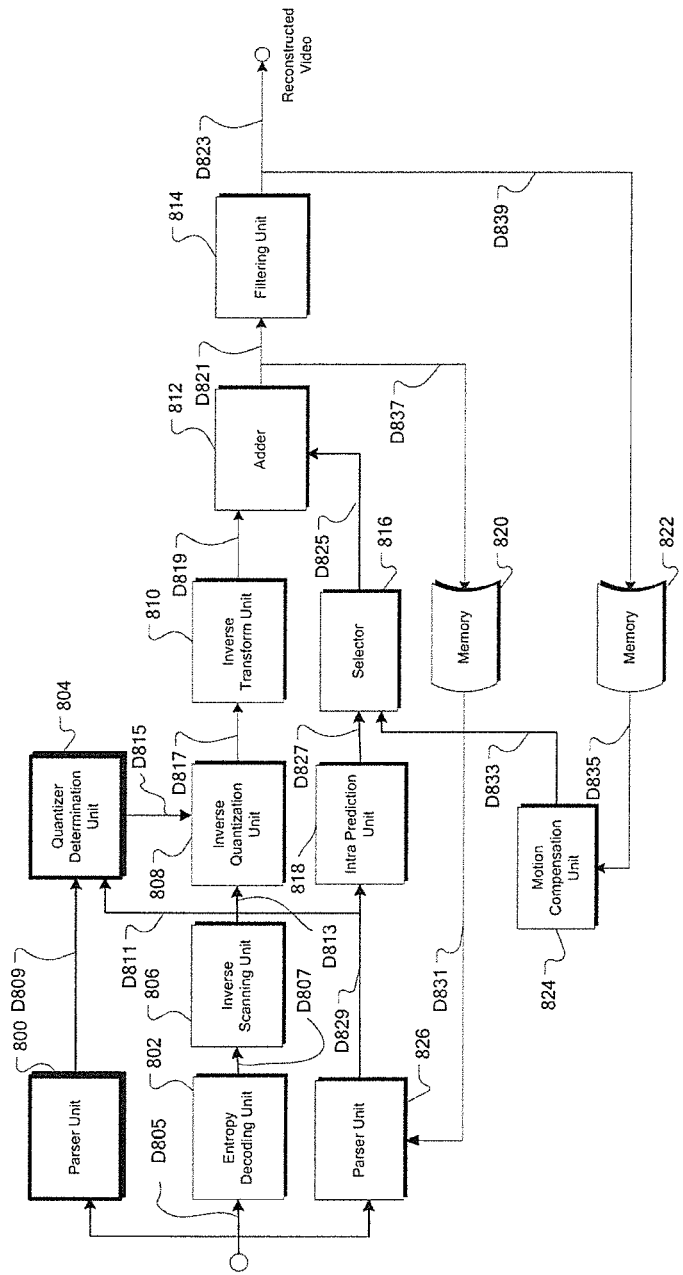

[Fig. 9]
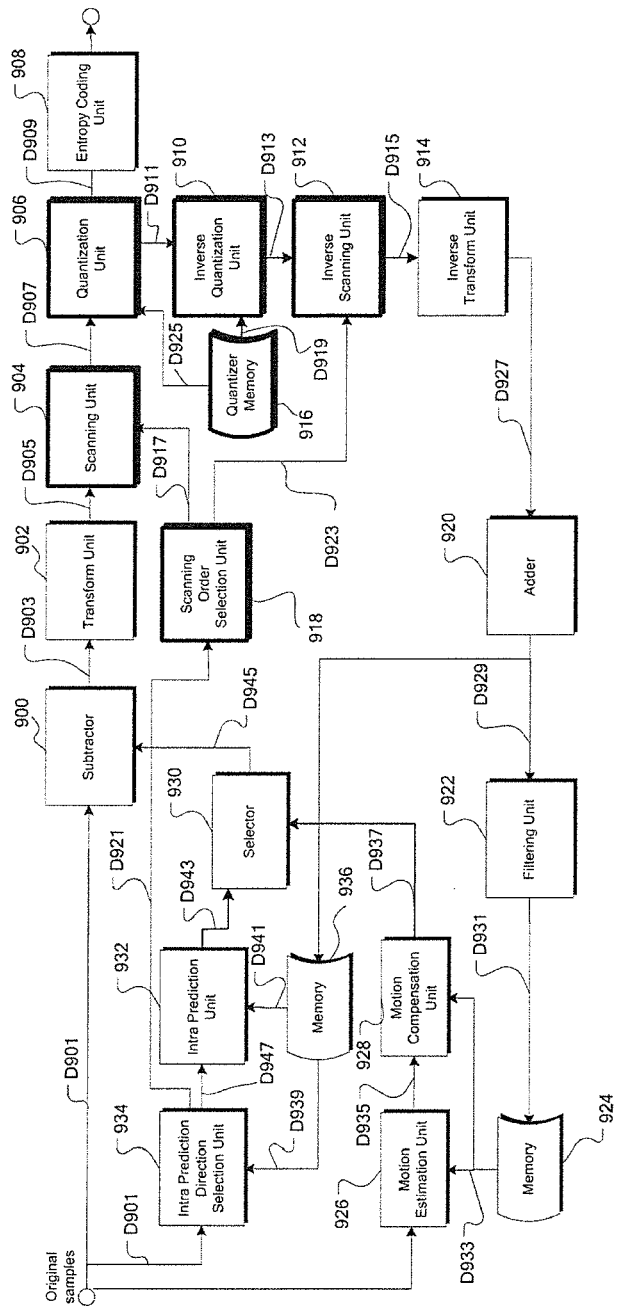

[Fig. 10]
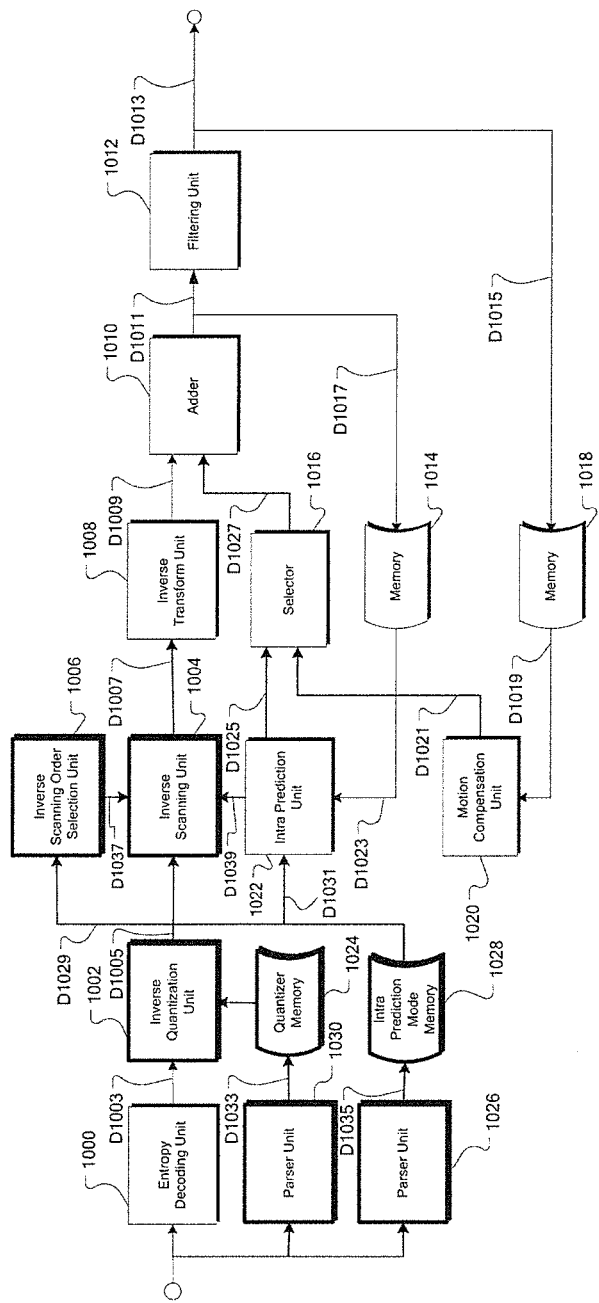

[Fig. 11]
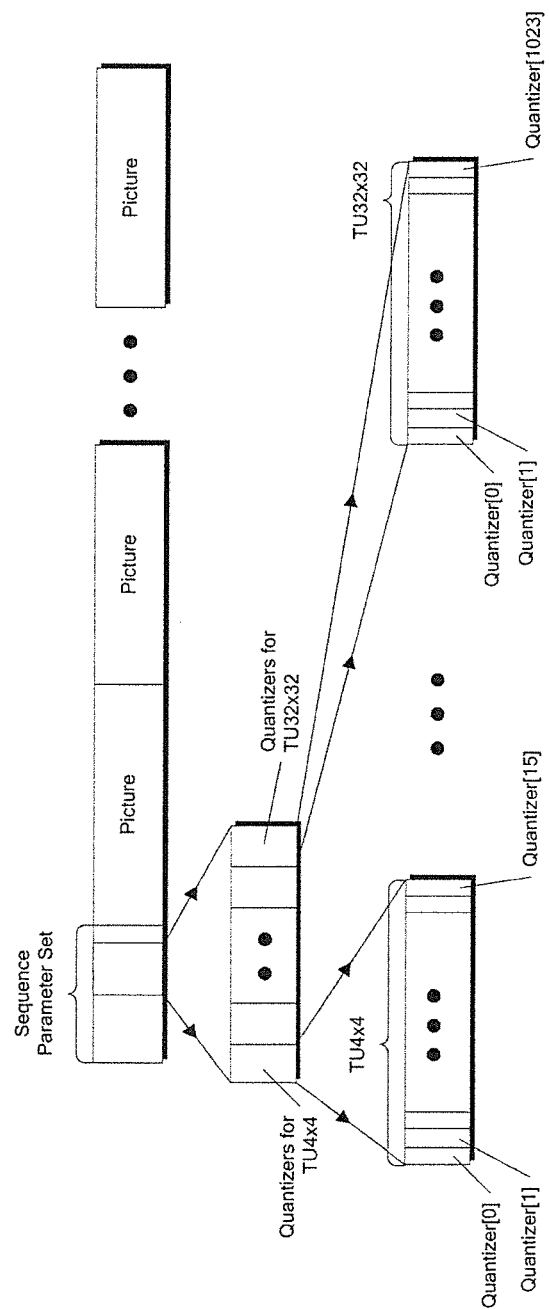

[Fig. 12]
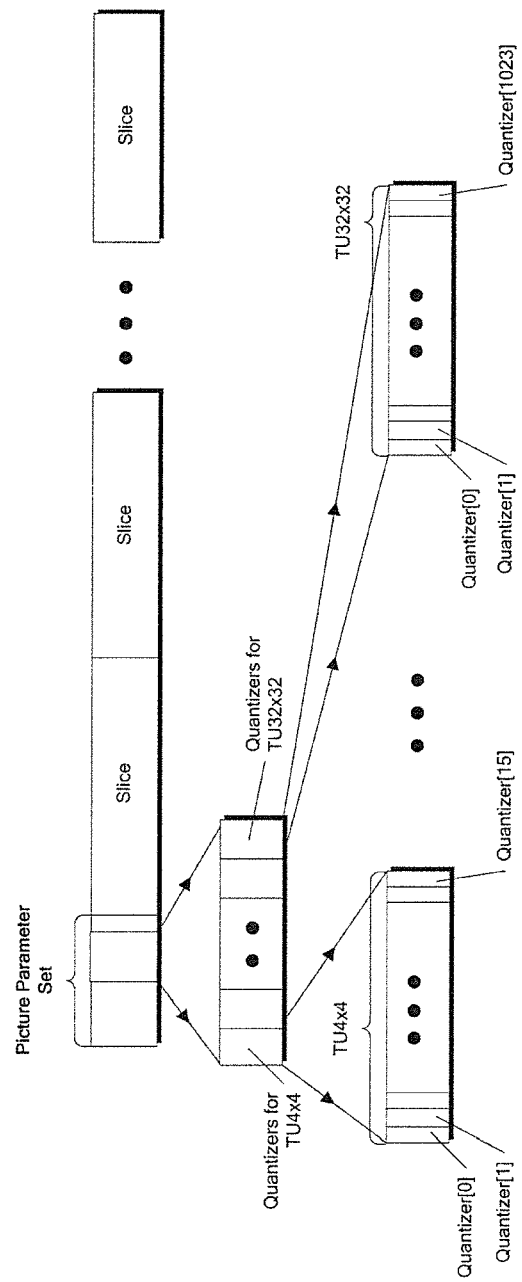

[Fig. 13]
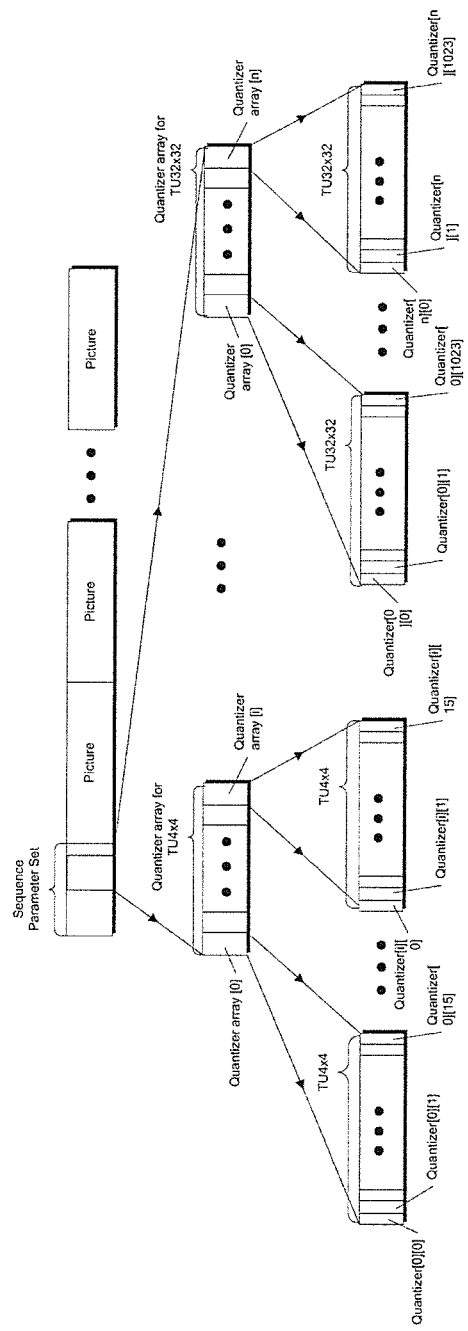

[Fig. 14]
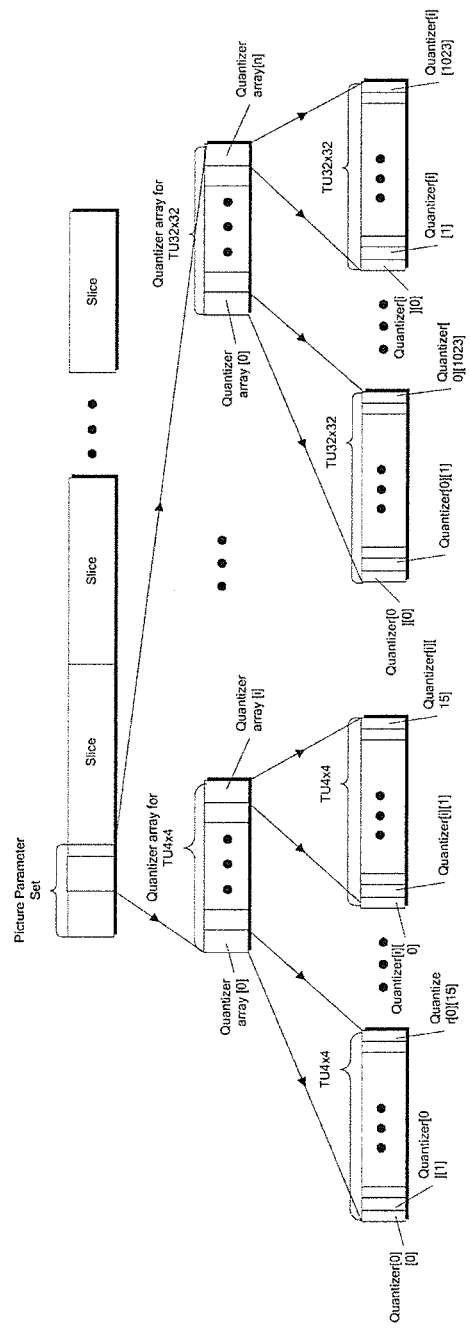

[Fig. 15]
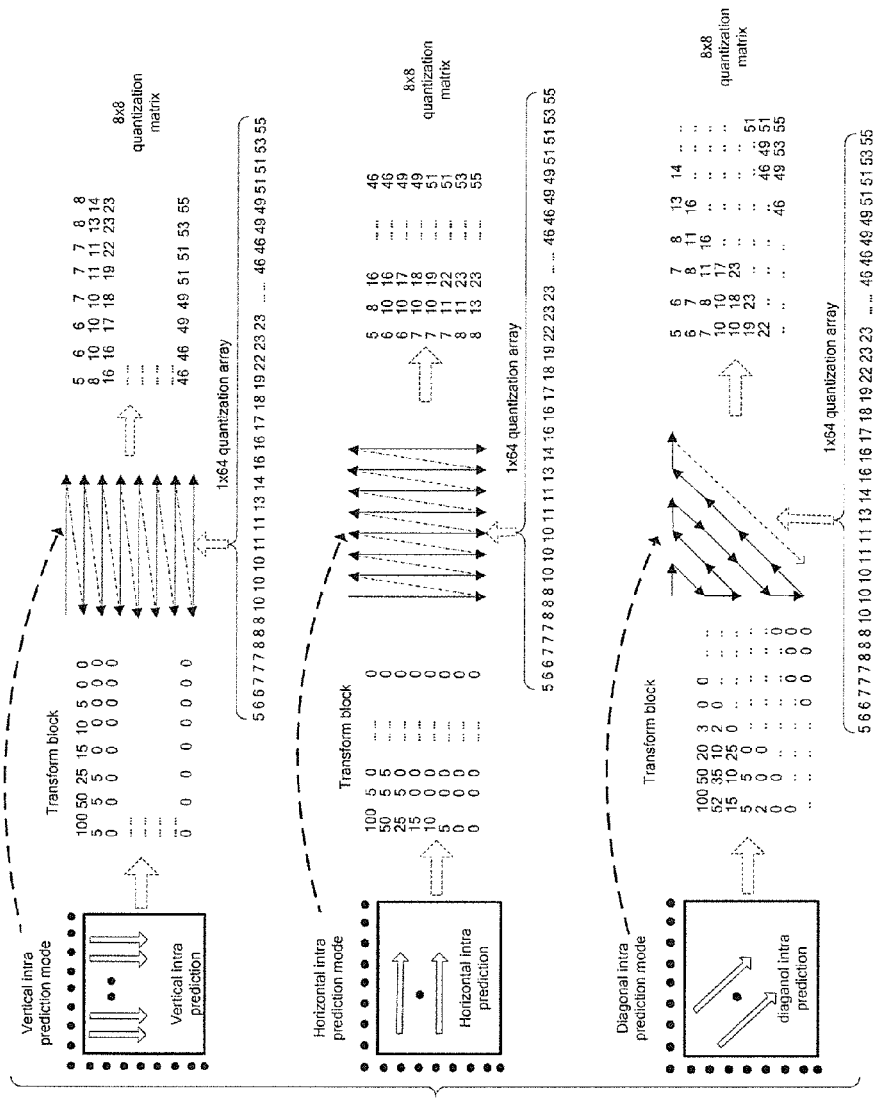

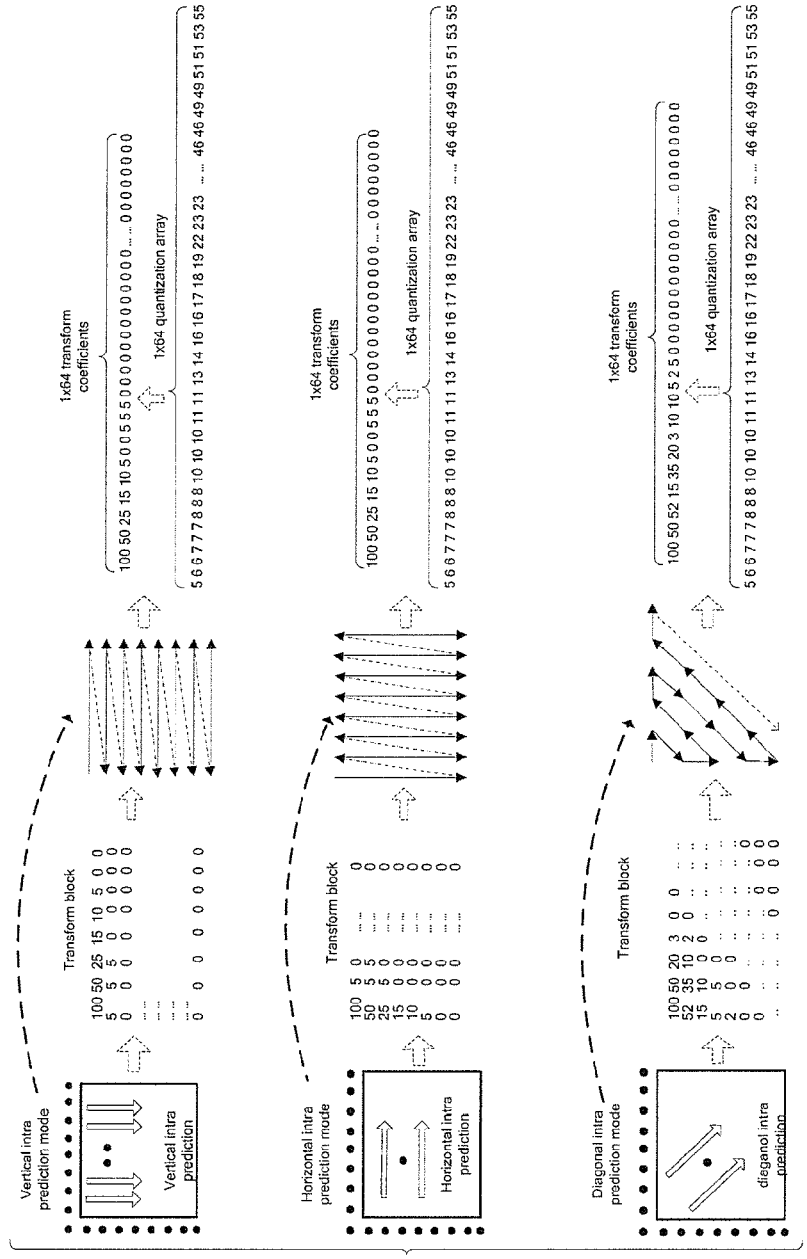
[Fig. 16]

[Fig. 17]
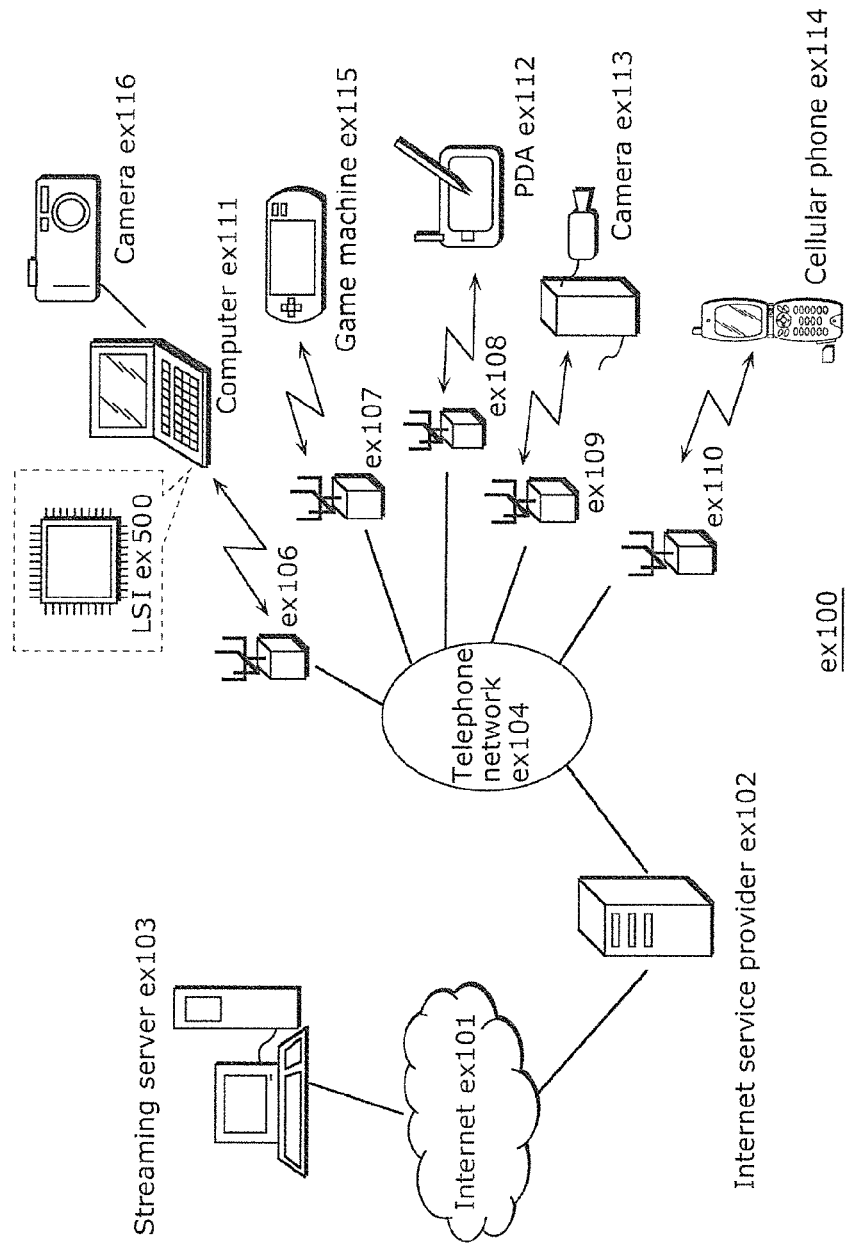

[Fig. 18]
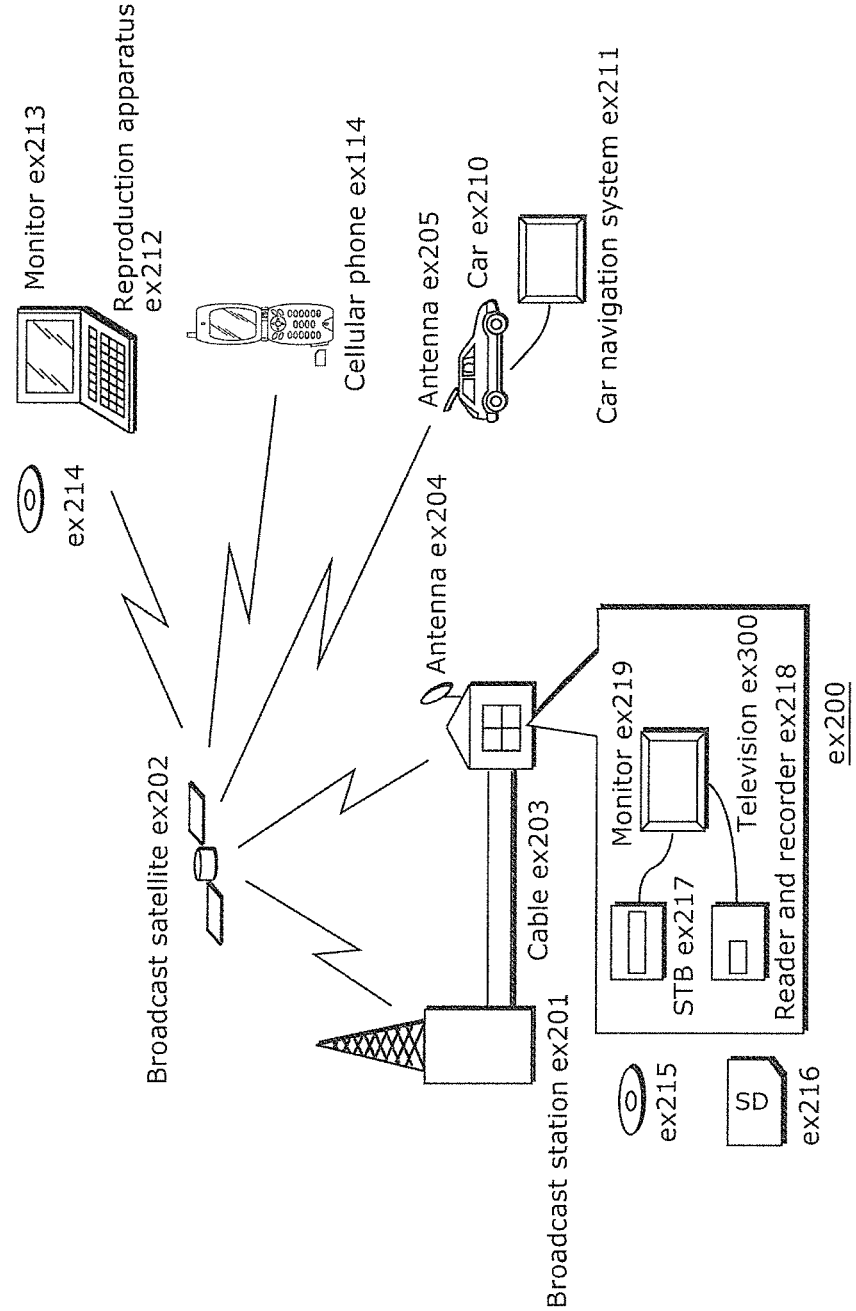

[Fig. 19]
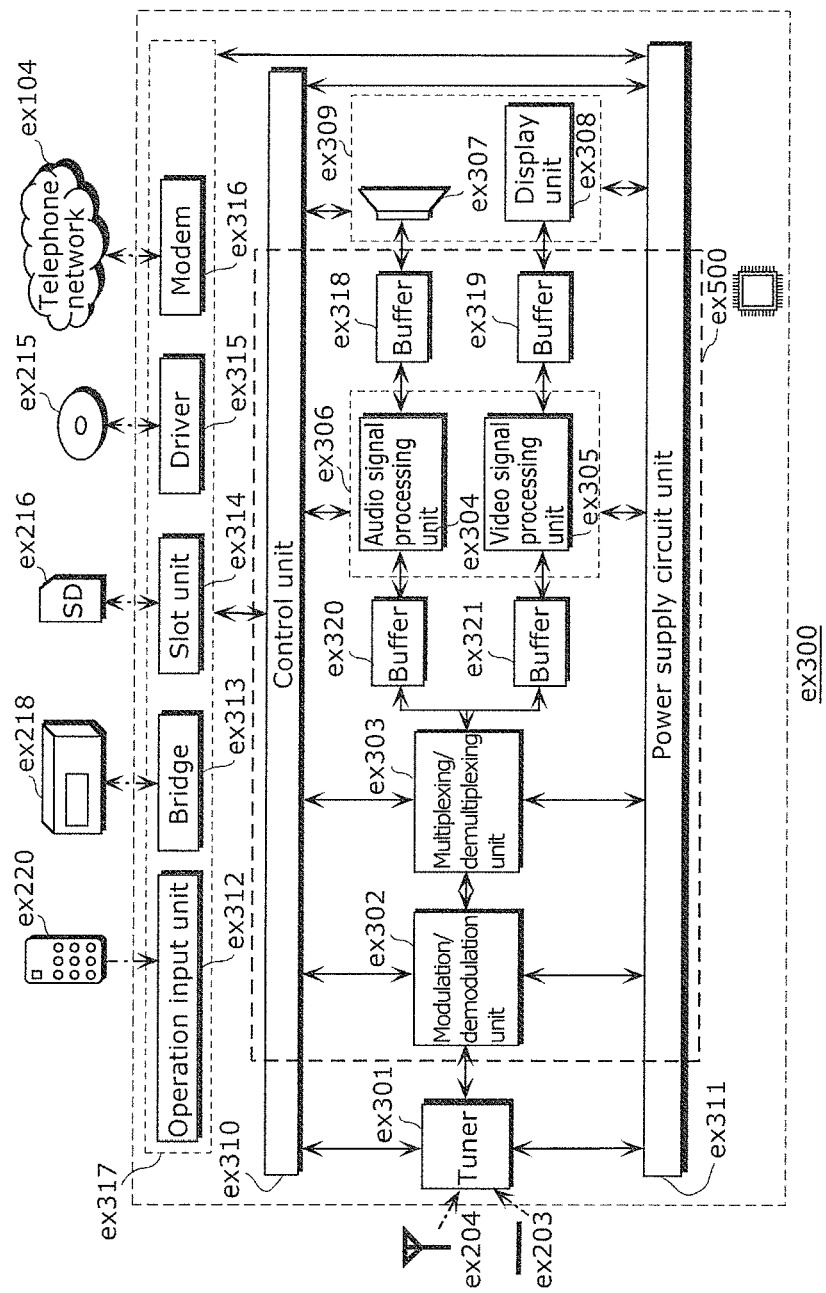

[Fig. 20]
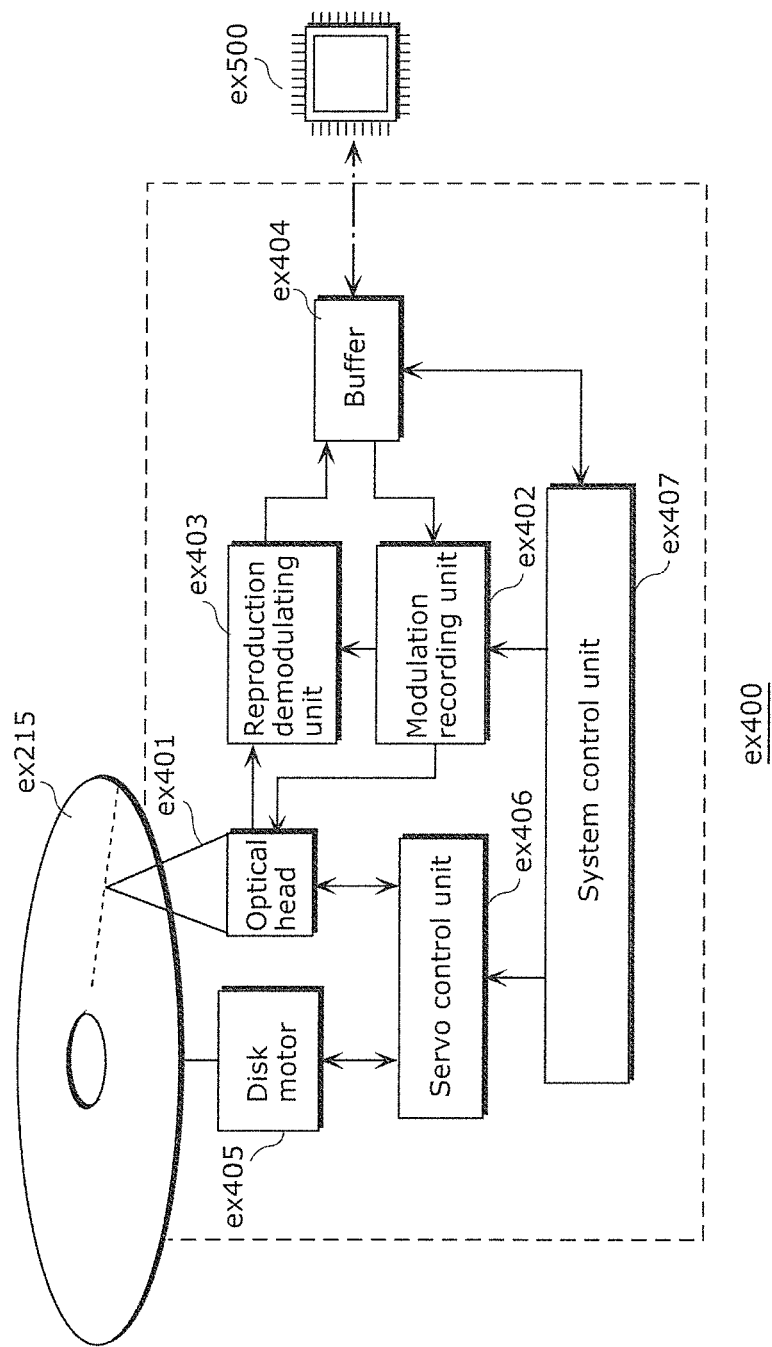

[Fig. 21]
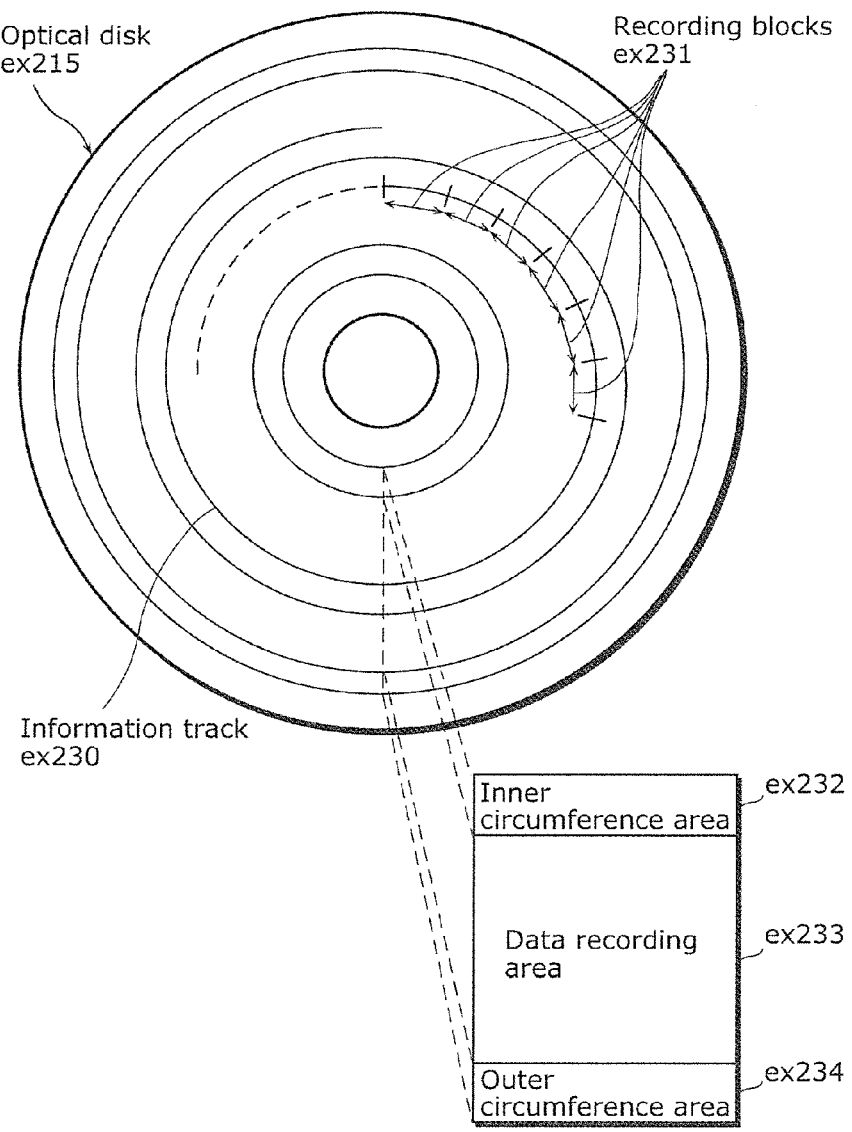

[Fig. 22A]
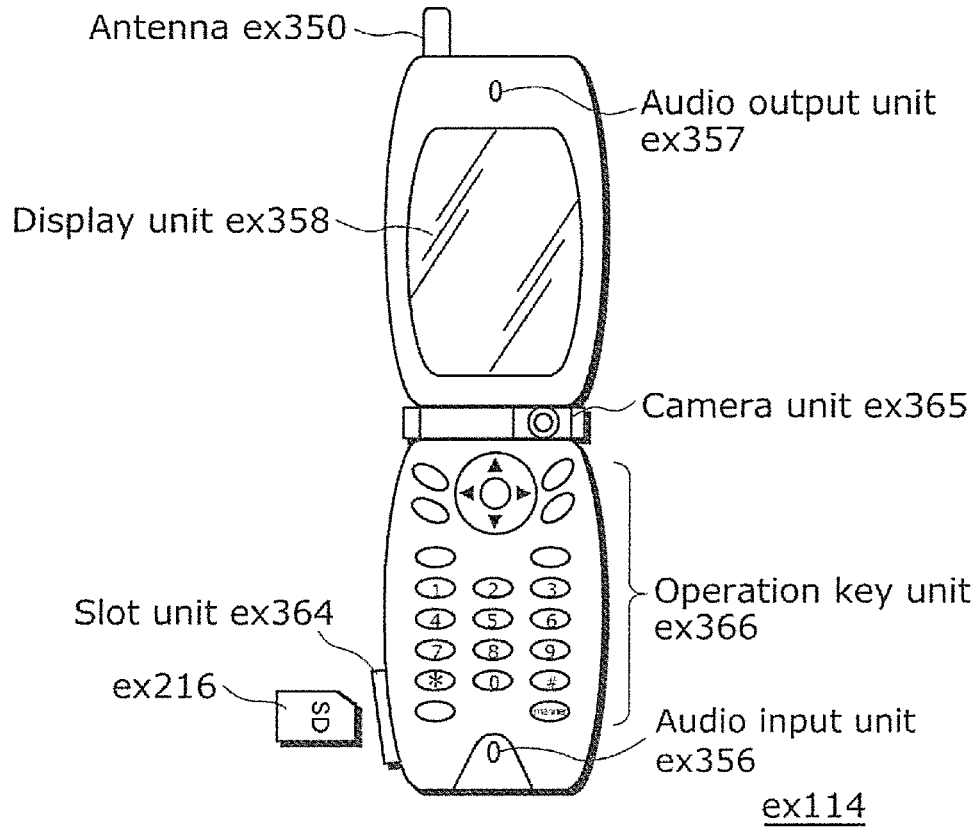
[Fig. 22B]
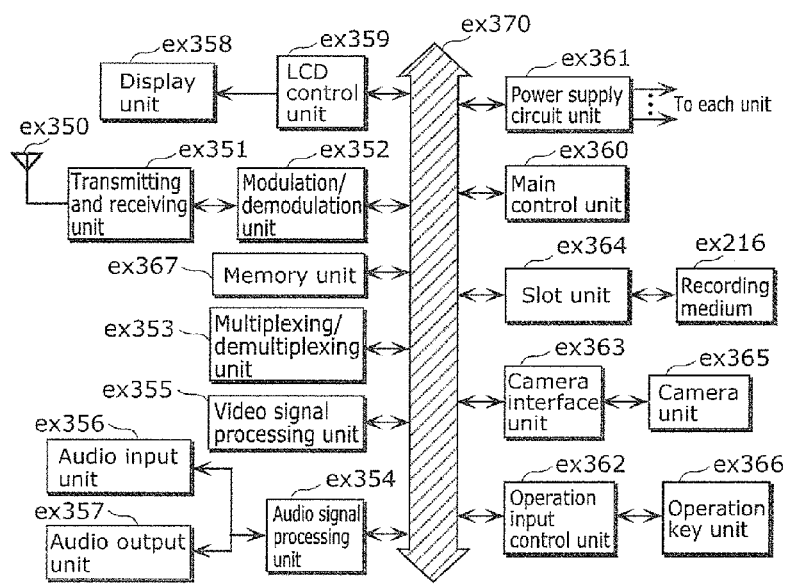

[Fig. 23]

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

[Fig. 24]
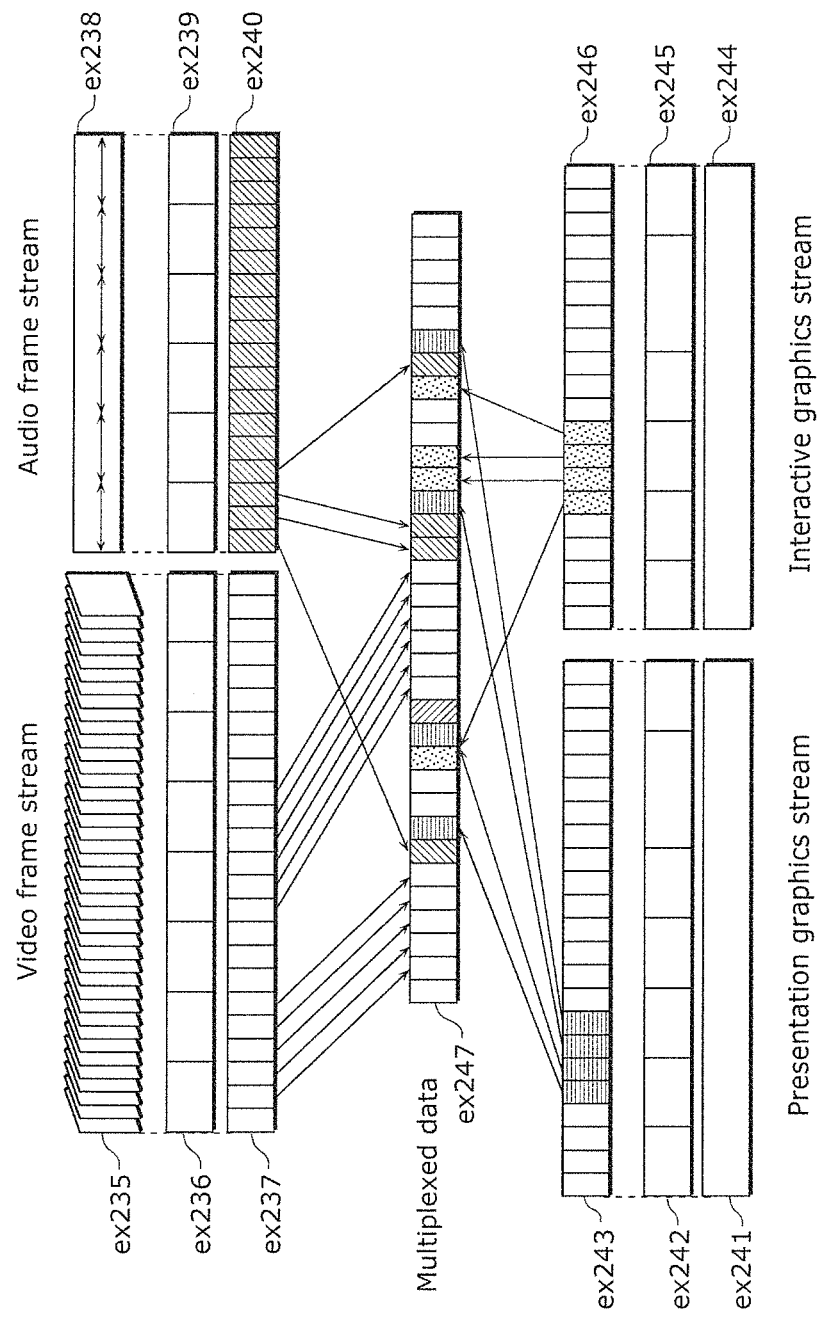

[Fig. 25]
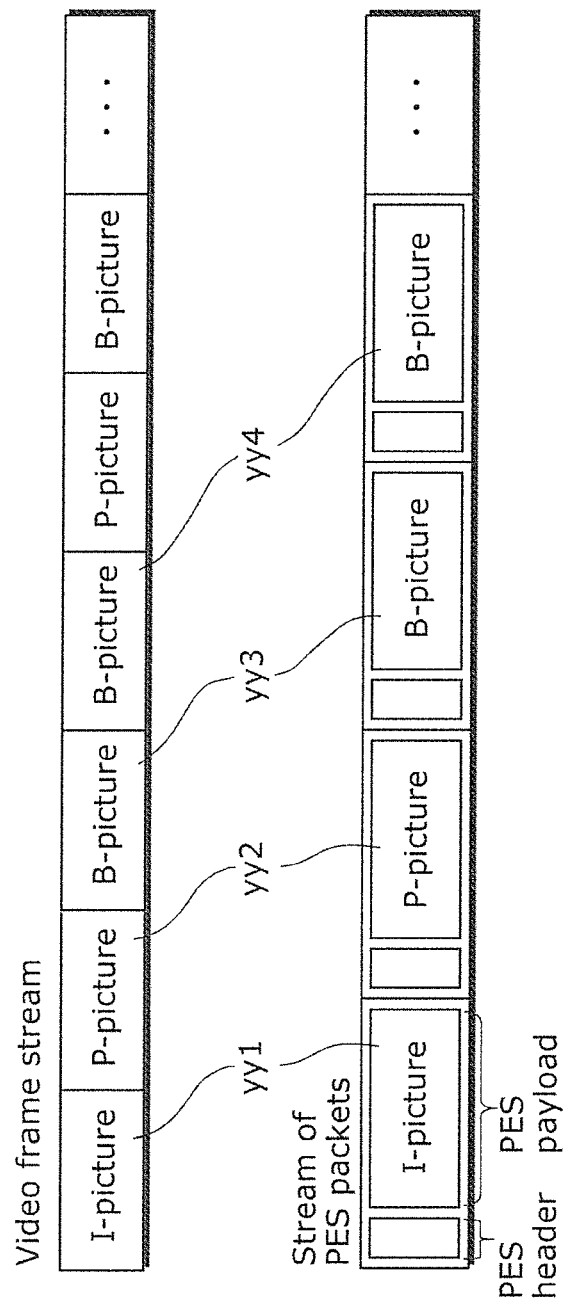

[Fig. 26]
Stream of TS packets
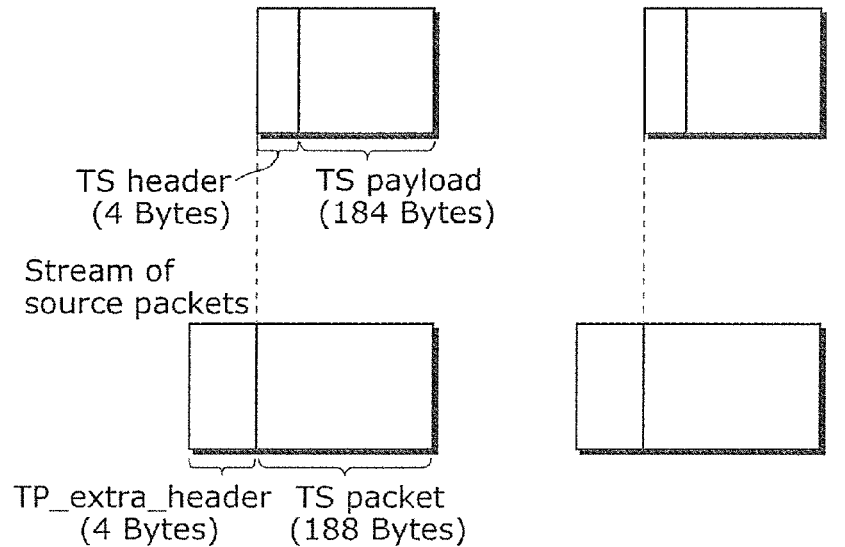
Multiplexed data
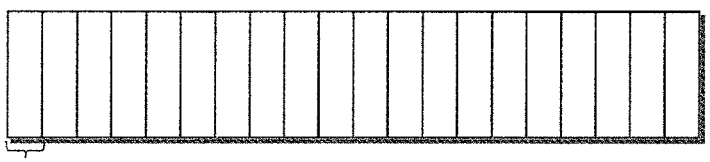
Source packet
[Fig. 27]
Data structure of PMT
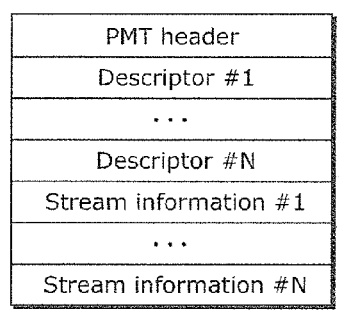
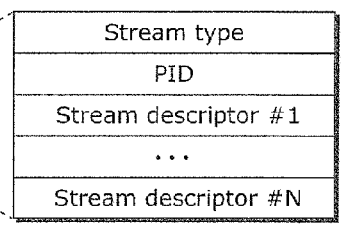

[Fig. 28]
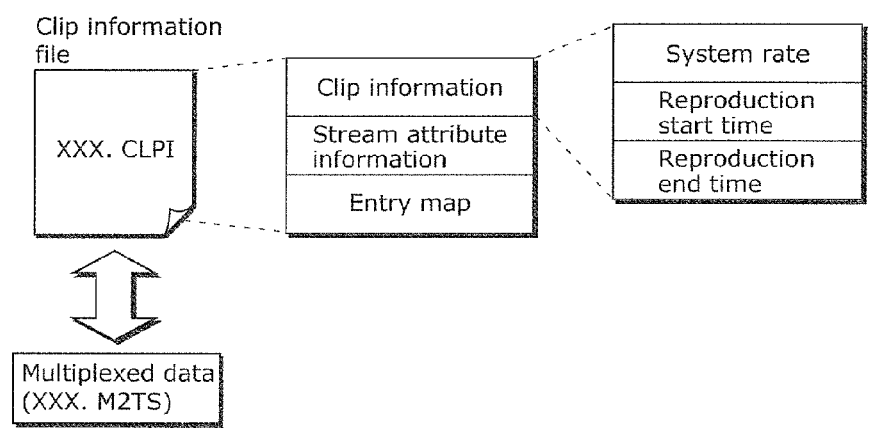

[Fig. 29]
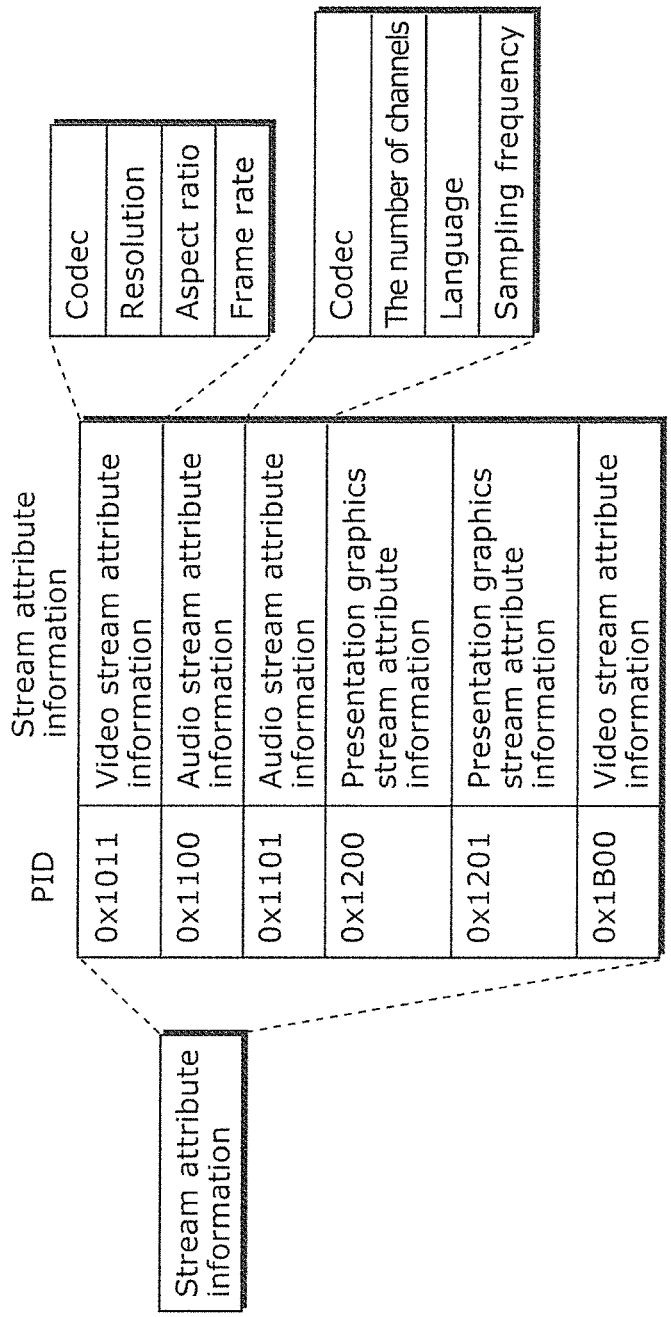

[Fig. 30]
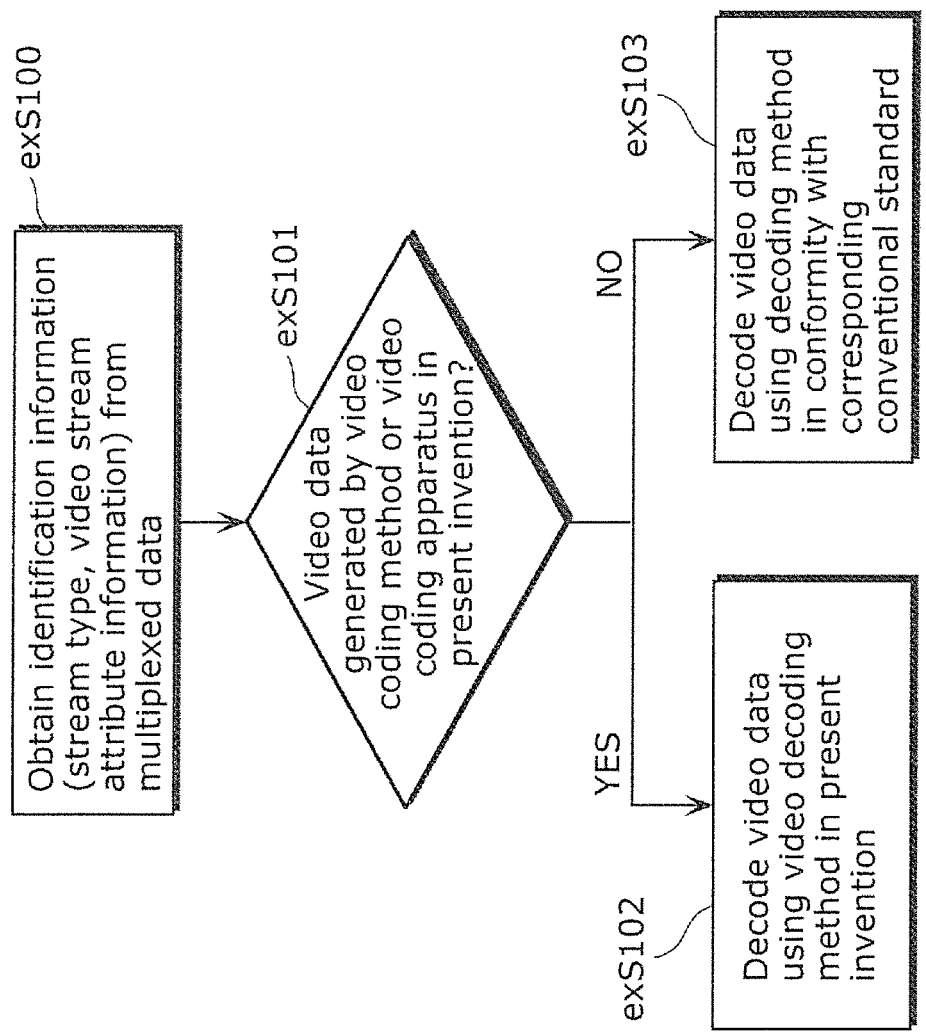

[Fig. 31]
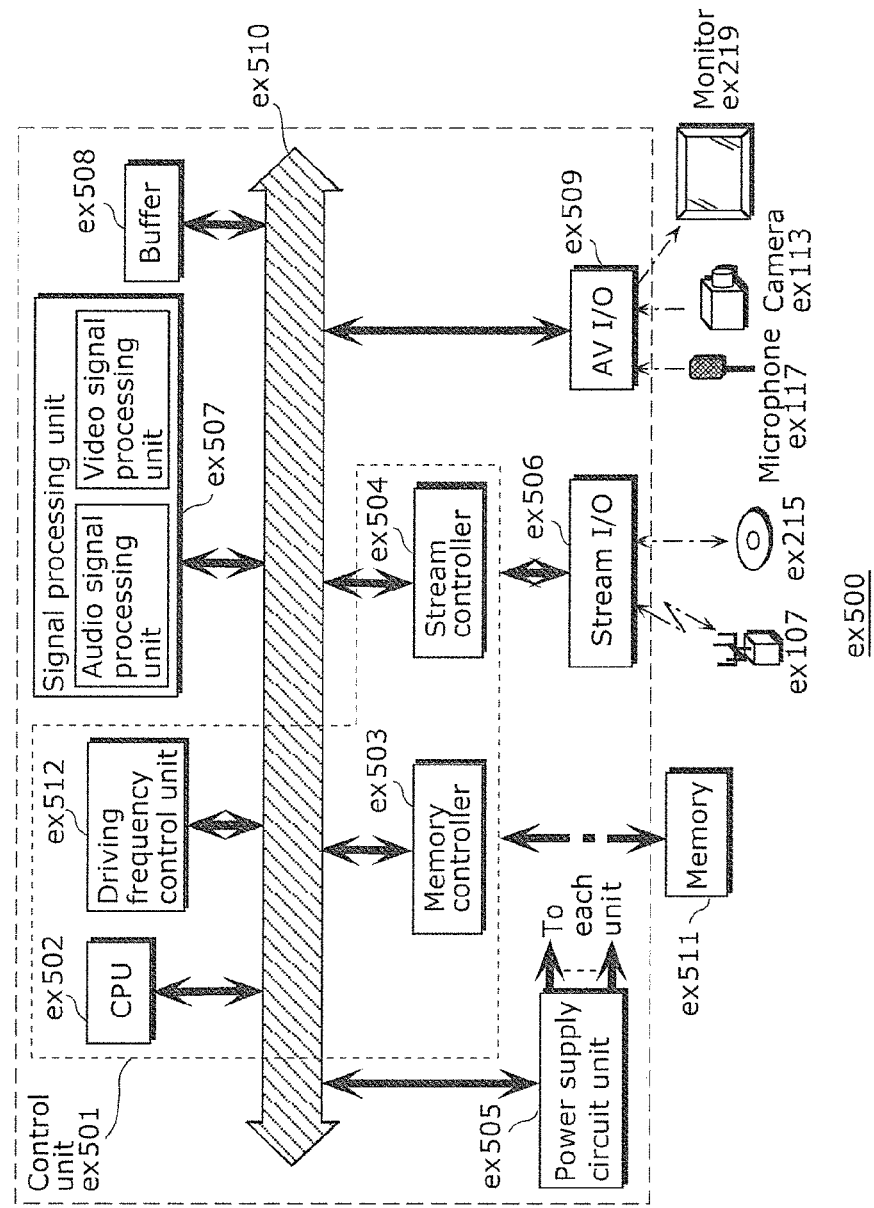

[Fig. 32]
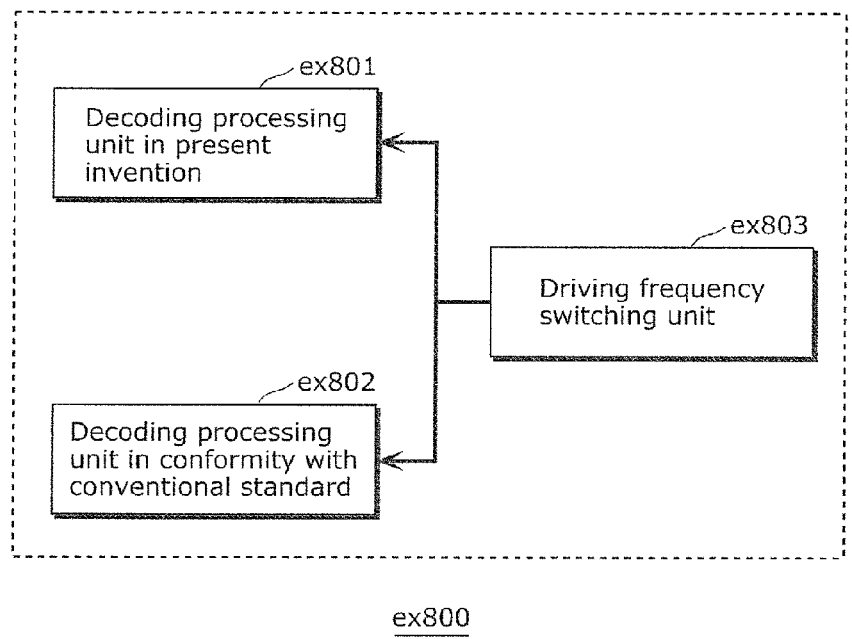

[Fig. 33]
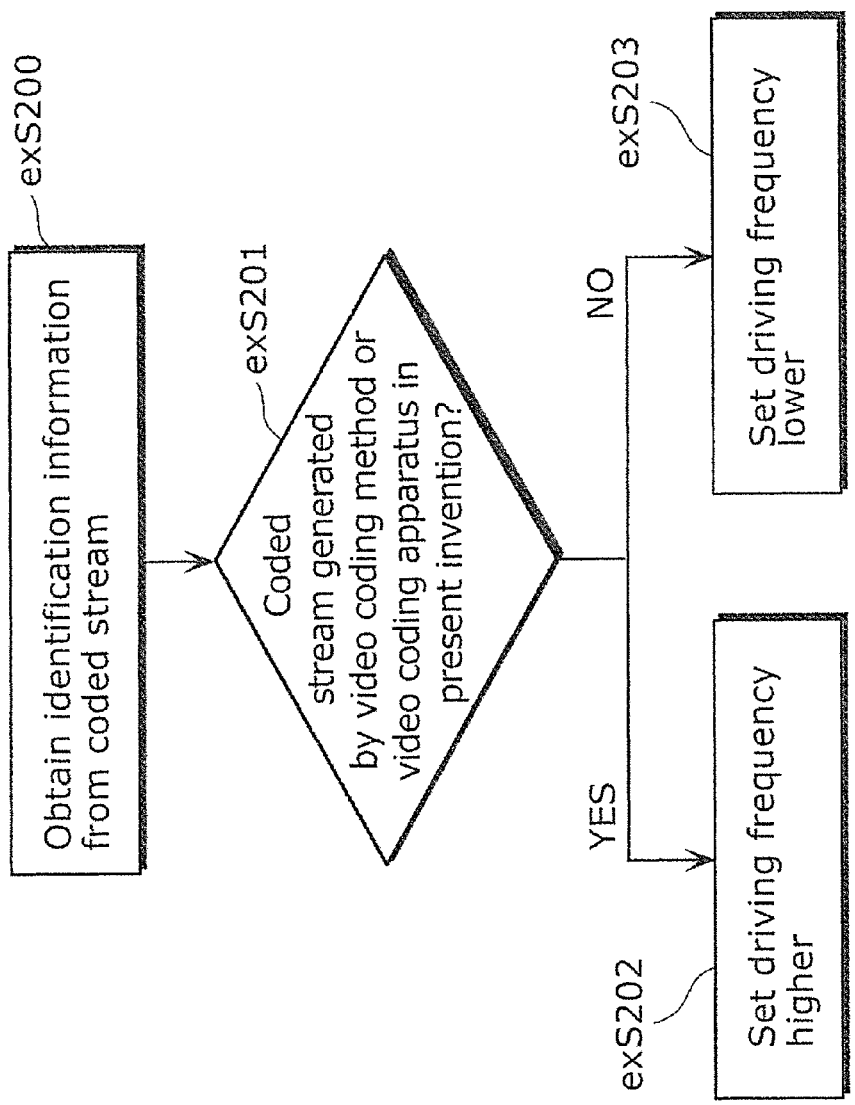

[Fig. 34]
| Corresponding standard | Driving frequency |
|---|---|
| MPEG-4 AVC | 500 MHz |
| MPEG-2 | 350 MHz |
| ⋮ | ⋮ |
[Fig. 35A]
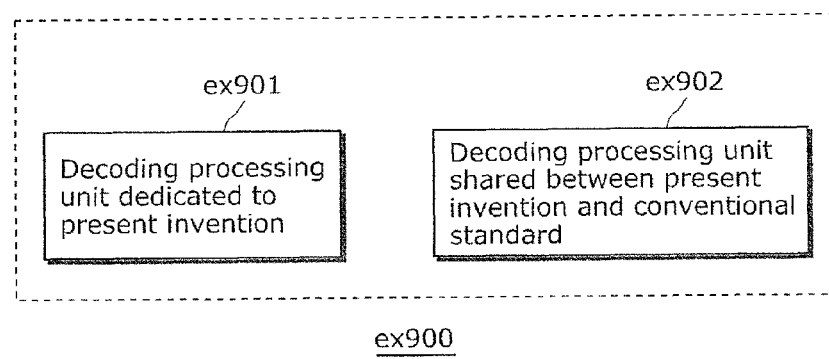
ex900

[Fig. 35B]
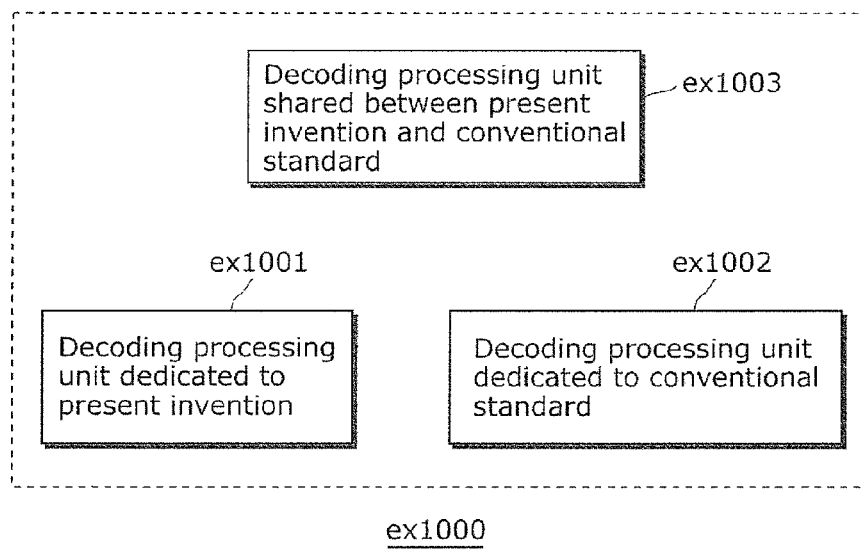

METHOD AND APPARATUS FOR ENCODING AND DECODING VIDEO USING INTRA PREDICTION MODE DEPENDENT ADAPTIVE QUANTIZATION MATRIX

This application is the National Stage of International Application No. PCT/JP2012/003814, filed Jun. 12, 2012, which claims the benefit of U.S. Provisional Application No. 61/496,122, filed Jun. 13, 2011.

TECHNICAL FIELD

This disclosure can be used in any multimedia data coding and, more particularly, in image and video coding supporting quantization matrix.

BACKGROUND ART

Examples of techniques regarding a method for coding images using quantization matrix include a technique described in Non Patent Literature 1.

CITATION LIST

Non Patent Literature

[NPL 1] ITU-T Recommendation H.264 "Advanced video coding for generic audio visual services", March, 2010

SUMMARY OF INVENTION

Technical Problem

Use of quantization matrix might cause processing delays or increase of an implementation cost.

In view of this, the present disclosure aims to provide a coding method using quantization matrix appropriately.

Solution to Problem

Additional benefits and advantages of the disclosed embodiments will be apparent from the Specification and Drawings. The benefits and/or advantages may be individually obtained by the various embodiments and features of the Specification and Drawings which need not all be provided in order to obtain one or more of the same.

In one general aspect, the techniques disclosed here feature a method of encoding video using intra prediction mode dependent quantization matrix comprising of: calculating an array of quantizers for each size of block unit; encoding the arrays of quantizers into header of compressed video stream; selecting one intra prediction mode from a plurality of intra prediction modes; performing an intra prediction process based on the selected intra prediction mode to get a block of prediction samples; subtracting a block of original samples from the block of prediction samples to obtain a block of residuals; performing a transform process on the block of residuals to produce a block of transform coefficients; selecting one scanning order based on the selected intra prediction mode among a plurality of scanning orders; scanning the array of quantizers to obtain a block of quantizers based on the selected scanning order; performing quantization process on the block of transform coefficients to obtain a block of quantized transform coefficients; performing a scanning process on the block of quantized transform coefficients to obtain an array of quantized transform coefficients; performing entropy coding on the array of quantized transform coefficients.

These general and specific aspects may be implemented using an apparatus, a system, an integrated circuit, a computer program, or a non-transitory computer-readable recording medium such as a CD-ROM, or any combination of apparatuses, systems, integrated circuits, computer programs, or recording media.

Advantageous Effects of Invention

Quantization matrix is appropriately used according to exemplary embodiments disclosed herein.

BRIEF DESCRIPTION OF DRAWINGS

FIG. 1 is a flowchart showing an encoding process in Embodiment 1.

FIG. 2 is a flowchart showing a decoding process in Embodiment 1.

FIG. 3 is a flowchart showing an encoding process in Embodiment 2.

FIG. 4 is a flowchart showing a decoding process in Embodiment 2.

FIG. 5 is a flowchart showing an encoding process in Embodiment 3.

FIG. 6 is a flowchart showing a decoding process in Embodiment 3.

FIG. 7 is a block diagram illustrating an example apparatus for a video encoder in Embodiment 1 and Embodiment 3.

FIG. 8 is a block diagram illustrating an example apparatus for a video decoder in Embodiment 1 and Embodiment 3.

FIG. 9 is a block diagram illustrating an example apparatus for a video encoder in Embodiment 2.

FIG. 10 is a block diagram illustrating an example apparatus for a video decoder in Embodiment 1 and Embodiment 3.

FIG. 11 is a diagram showing the locations of a plurality of quantizers in a header of a sequence, where each TU size corresponds with a single quantization matrix.

FIG. 12 is a diagram showing the locations of a plurality of quantizers in a header of an image, where each TU size corresponds with a single quantization matrix.

FIG. 13 is a diagram showing the locations of a plurality of quantizer arrays in a header of a sequence, where each TU size corresponds with a plurality of quantization matrix.

FIG. 14 is a diagram showing the locations of a plurality of quantizer arrays in a header of an image, where each TU size corresponds with a plurality of quantization matrix.

FIG. 15 is a diagram showing three examples of how the quantization matrix is adaptively adjusted based on the intra prediction mode in Embodiment 1.

FIG. 16 is a diagram showing three examples of how the quantization matrix is adaptively adjusted based on the intra prediction mode in Embodiment 2.

FIG. 17 shows an overall configuration of a content providing system for implementing content distribution services.

FIG. 18 shows an overall configuration of a digital broadcasting system.

FIG. 19 shows a block diagram illustrating an example of a configuration of a television.

FIG. 20 shows a block diagram illustrating an example of a configuration of an information reproducing/recording unit that reads and writes information from and on a recording medium that is an optical disk.

FIG. 21 shows an example of a configuration of a recording medium that is an optical disk.

FIG. 22A shows an example of a cellular phone.

FIG. 22B is a block diagram showing an example of a configuration of a cellular phone.

FIG. 23 illustrates a structure of multiplexed data.

FIG. 24 schematically shows how each stream is multiplexed in multiplexed data.

FIG. 25 shows how a video stream is stored in a stream of PES packets in more detail.

FIG. 26 shows a structure of TS packets and source packets in the multiplexed data.

FIG. 27 shows a data structure of a PMT.

FIG. 28 shows an internal structure of multiplexed data information.

FIG. 29 shows an internal structure of stream attribute information.

FIG. 30 shows steps for identifying video data.

FIG. 31 shows an example of a configuration of an integrated circuit for implementing the moving picture coding method and the moving picture decoding method according to each of embodiments.

FIG. 32 shows a configuration for switching between driving frequencies.

FIG. 33 shows steps for identifying video data and switching between driving frequencies.

FIG. 34 shows an example of a look-up table in which video data standards are associated with driving frequencies.

FIG. 35A is a diagram showing an example of a configuration for sharing a module of a signal processing unit.

FIG. 35B is a diagram showing another example of a configuration for sharing a module of the signal processing unit.

DESCRIPTION OF EMBODIMENTS (Underlying Knowledge Forming Basis of the Present Disclosure)

Quantization matrix (QM) has been used in several image and video coding standards inclusive JPEG, MPEG-2, MPEG-4 and H.264/AVC. The concept of QM is to apply different quantizers to different frequency components of transform block unit. In current video standards, only one quantization matrix can be used in the encoder size and transmitted to the decoder side.

In H.264/AVC standard, intra prediction is used to produce a block of residuals by predicting the current samples of a block unit from a reference samples. Prior to intra prediction process, an intra prediction mode should be selected among a plurality of intra prediction modes. Intra prediction process could produce a block of residuals using the selected intra prediction mode. Then, the block of residuals are proceeded into the following encoding process such as transform, quantization and entropy encoding, and finally coded into a bit stream.

It is observed that the residuals usually have different directional distributions after intra prediction process such as vertical direction, horizontal direction, diagonal direction, and etc., which in turn results in directional distributions of the transform coefficients after the transform process. Moreover, the distribution of the residuals in a block is highly related to the selected intra prediction mode.

Currently, quantization matrix is used in video coding in order to improve the subjective video quality. A block containing different quantizers could be calculated based on the predefined quantization matrix and the quantizers are used to quantize different transform coefficients.

However, since the distribution property of the transform coefficients may vary block by block, multiple quantization matrixes are usually predefined for a block unit. For each block of transform coefficients, one quantization matrix is selected for the following quantization process. In order for the decoder to select the same quantization matrix, an index number should be encoded into the bit streams for each block unit.

The problem with the prior art is that utilization of multiple quantization matrixes for a block unit requires a lot of memories for hardware implementation.

Index numbers for block units are required to be transported to the decoder in order for the decoder to identify the same quantization matrixes. Therefore, another problem is that use of index numbers increases the overall bitrates.

Current disclosure provides three solutions. The first and second solutions are to signal a single quantization matrix for each size of block unit, but quantizers in the quantization matrix can be adaptively selected according to the selected intra prediction mode. At the decoder, the same quantization matrix can be retrieved according to the parsed intra prediction mode. With these two solutions, only a single quantization matrix is required to be stored in the memory for a block unit, and the index number is not required any more.

The third solution is to signal a plurality of quantization matrixes for each size of block unit and, select one quantization matrix for each intra block according to the selected intra prediction mode. In this case, no index number is required to be encoded. Therefore, it does not introduce additional overheads.

What is novel of current disclosure is that the quantization matrix can be adaptively determined for a block unit based on the information of selected intra prediction mode. That is, this disclosure does not require that the encoder sends the quantization matrix index number to the decoder.

For example, a method according to an exemplary embodiment of the present disclosure is a method of encoding video using intra prediction mode dependent quantization matrix comprising of: calculating an array of quantizers for each size of block unit; encoding the arrays of quantizers into header of compressed video stream; selecting one intra prediction mode from a plurality of intra prediction modes; performing an intra prediction process based on the selected intra prediction mode to get a block of prediction samples; subtracting a block of original samples from the block of prediction samples to obtain a block of residuals; performing a transform process on the block of residuals to produce a block of transform coefficients; selecting one scanning order based on the selected intra prediction mode among a plurality of scanning orders; scanning the array of quantizers to obtain a block of quantizers based on the selected scanning order; performing quantization process on the block of transform coefficients to obtain a block of quantized transform coefficients; performing a scanning process on the block of quantized transform coefficients to obtain an array of quantized transform coefficients; performing entropy coding on the array of quantized transform coefficients.

Further, for example, a method according to an exemplary embodiment of the present disclosure may be a method of decoding video using intra prediction mode dependent quantization matrix comprising of: parsing a header of compressed video stream to obtain an array of quantizers for a block unit; parsing a header of a coding unit of compressed video stream to obtain a selection parameter to select one intra prediction mode from a plurality of predefined intra prediction modes; performing entropy decoding to obtain an array of quantized transform coefficients; performing inverse scanning process on the array of quantized transform coefficients to obtain a block of quantized transform coefficients; selecting one scanning order from a plurality of scanning orders based on the parsed intra prediction mode; scanning the array of quantizers to obtain a block of quantizers based on the selected scanning order; performing inverse quantization process on the block of quantized transform coefficients using the block of quantizers to obtain a block of reconstructed transform coefficients; performing inverse transform on the block of transform coefficients to obtain a block of reconstructed residuals; performing intra prediction process based on the parsed intra prediction mode.

Further, for example, a method according to an exemplary embodiment of the present disclosure may be a method of encoding video using intra prediction mode dependent quantization matrix comprising of: calculating an array of quantizers for each size of block unit; encoding the arrays of quantizers into header of compressed video stream; selecting one intra prediction mode from a plurality of intra prediction modes; performing an intra prediction process based on the selected intra prediction mode to get a block of prediction samples; subtracting a block of original samples from the block of prediction samples to obtain a block of residuals; performing a transform process on the block of residuals to produce a block of transform coefficients; selecting one scanning order based on the selected intra prediction mode among a plurality of scanning orders; performing scanning process on the block of transform coefficients to obtain an array of transform coefficients; performing quantization process on the array of transform coefficients using the array of quantizers to obtain an array of quantized transform coefficients; performing entropy coding on the array of quantized transform coefficients.

Further, for example, a method according to an exemplary embodiment of the present disclosure may be a method of decoding video using intra prediction mode dependent quantization matrix comprising of: parsing a header of compressed video stream to obtain an array of quantizers for a block unit; parsing a header of a coding unit of compressed video stream to obtain a selection parameter to select one intra prediction mode from a plurality of predefined intra prediction modes; performing entropy decoding to obtain an array of quantized transform coefficients; performing inverse quantization process on the array of quantized transform coefficients using the array of quantizers to obtain an array of reconstructed transform coefficients; selecting one scanning order from a plurality of scanning orders based on the parsed intra prediction mode; performing inverse scanning process on the array of reconstructed transform coefficients to obtain a block of reconstructed transform coefficients; performing inverse transform on the block of reconstructed transform coefficients to obtain a block of reconstructed residuals; performing intra prediction process based on the parsed intra prediction mode.

Further, for example, a method according to an exemplary embodiment of the present disclosure may be a method of decoding video using intra prediction mode dependent quantization matrix comprising of: calculating a plurality of blocks of quantizers for each size of block unit; encoding the blocks of quantizers into header of compressed video stream; selecting an intra prediction mode among a plurality of intra prediction modes; performing an intra prediction process based on the selected intra prediction mode to get a block of prediction samples; subtracting a block of original samples from the block of prediction samples to obtain a block of residuals; performing a transform process on the block of residuals to produce a block of transform coefficients; selecting a block of quantizers based on the selected intra prediction mode from the plurality blocks of quantizers; performing quantization process on the block of transform coefficients using the selected block of quantizers to obtain a block of quantized transform coefficients; performing scanning process on the block of quantized transform coefficients to obtain an array of quantized transform coefficients; performing entropy encoding on the array of quantized transform coefficients.

Further, for example, a method according to an exemplary embodiment of the present disclosure may be a method of decoding video using intra prediction mode dependent quantization matrix comprising of: parsing a header of a compressed video stream to obtain plurality blocks of quantizers; parsing a header of a coding unit of compressed stream to obtain a selection parameter to select one intra prediction mode from a plurality of predefined intra prediction modes; performing entropy decoding to obtain an array of quantized transform coefficients; performing inverse scanning process on the array of quantized transform coefficients to obtain a block of quantized transform coefficients; selecting one block of quantizers based on the parsed intra prediction mode from the plurality blocks of quantizers; performing inverse quantization process on the block of quantized transform coefficients using the selected block of quantizers to obtain a block of reconstructed transform coefficients; performing inverse transform process on the block of reconstructed transform coefficients to obtain a block of reconstructed residuals; performing intra prediction process based on the parsed intra prediction mode.

For example, an apparatus according to an exemplary embodiment of the present disclosure is an apparatus for encoding video using intra prediction mode dependent quantization matrix comprising of: a calculating unit operable to determine an array of quantizers for each size of block unit; an encoding unit operable to encoding the arrays of quantizers into header of compressed video stream; a selection unit operable to select one intra prediction mode from a plurality of intra prediction modes; an intra prediction unit operable to perform an intra prediction process based on the selected intra prediction mode to get a block of prediction samples; a subtraction unit operable to subtract a block of original samples from the block of prediction samples to obtain a block of residuals; a transform unit operable to perform a transform process on the block of residuals to produce a block of transform coefficients; a selection unit operable to select one scanning order based on the selected intra prediction mode among a plurality of scanning orders; a scanning unit operable to scan the array of quantizers to obtain a block of quantizers based on the selected scanning order; a quantization unit operable to perform quantization process on the block of transform coefficients to obtain a block of quantized transform coefficients; a scanning unit operable to perform scanning process on the block of quantized transform coefficients to obtain an array of quantized transform coefficients; an entropy coding unit operable to perform entropy coding on the array of quantized transform coefficients.

Further, for example, an apparatus according to an exemplary embodiment of the present disclosure may be an apparatus for decoding video using intra prediction mode dependent quantization matrix comprising of: a parsing unit operable to parse a header of compressed video stream to obtain an array of quantizers for a block unit; a parsing unit operable to parse a header of a coding unit of compressed video stream to obtain a selection parameter to select one intra prediction mode from a plurality of predefined intra prediction modes; an entropy decoding unit operable to perform entropy decoding to obtain an array of quantized transform coefficients; an inverse scanning unit operable to perform inverse scanning process on the array of quantized transform coefficients to obtain a block of quantized transform coefficients; a scanning selection unit operable to select one scanning order from a plurality of scanning orders based on the parsed intra prediction mode; a scanning unit operable to scan the array of quantizers to obtain a block of quantizers based on the selected scanning order; an inverse quantization unit operable to perform inverse quantization process on the block of quantized transform coefficients using the block of quantizers to obtain a block of reconstructed transform coefficients; an inverse transform unit operable to perform inverse transform on the block of transform coefficients to obtain a block of reconstructed residuals; intra prediction unit to perform intra prediction process based on the parsed intra prediction mode.

Further, for example, an apparatus according to an exemplary embodiment of the present disclosure may be an apparatus of encoding video using intra prediction mode dependent quantization matrix comprising of: a calculating unit operable to determine an array of quantizers for each size of block unit; an encoding unit operable to encode the arrays of quantizers into header of compressed video stream; a selection unit operable to select one intra prediction mode from a plurality of intra prediction modes; an intra prediction unit operable to perform an intra prediction process based on the selected intra prediction mode to get a block of prediction samples; a subtraction unit operable to subtract a block of original samples from the block of prediction samples to obtain a block of residuals; a transform unit operable to perform transform process on the block of residuals to produce a block of transform coefficients; a selection unit operable to select one scanning order based on the selected intra prediction mode among a plurality of scanning orders; a scanning unit operable to perform scanning process on the block of transform coefficients to obtain an array of transform coefficients; a quantization unit operable to perform quantization process on the array of transform coefficients using the array of quantizers to obtain an array of quantized transform coefficients; an entropy coding unit operable to perform entropy coding on the array of quantized transform coefficients.

Further, for example, an apparatus according to an exemplary embodiment of the present disclosure may be an apparatus of decoding video using intra prediction mode dependent quantization matrix comprising of: a parsing unit operable to parse a header of compressed video stream to obtain an array of quantizers for a block unit; a parsing unit operable to parse a header of a coding unit of compressed video stream to obtain a selection parameter to select one intra prediction mode from a plurality of predefined intra prediction modes; an entropy decoding unit operable to perform entropy decoding to obtain an array of quantized transform coefficients; an inverse quantization unit operable to perform inverse quantization process on the array of quantized transform coefficients using the array of quantizers to obtain an array of reconstructed transform coefficients; a selection unit operable to select one scanning order from a plurality of scanning orders based on the parsed intra prediction mode; an inverse scanning unit operable to perform inverse scanning process on the array of reconstructed transform coefficients to obtain a block of reconstructed transform coefficients; an inverse transform unit operable to perform inverse transform on the block of reconstructed transform coefficients to obtain a block of reconstructed residuals; an intra prediction unit operable to perform intra prediction process based on the parsed intra prediction mode.

Further, for example, an apparatus according to an exemplary embodiment of the present disclosure may be an apparatus a method of decoding video using intra prediction mode dependent quantization matrix comprising of: a calculating unit operable to determine a plurality of blocks of quantizers for each size of block unit; an encoding unit operable to encode the blocks of quantizers into header of compressed video stream; a selection unit operable to select an intra prediction mode among a plurality of intra prediction modes; an intra prediction unit operable to perform an intra prediction process based on the selected intra prediction mode to get a block of prediction samples; a subtraction unit operable to subtract a block of original samples from the block of prediction samples to obtain a block of residuals; a transform unit operable to perform a transform process on the block of residuals to produce a block of transform coefficients; a selection unit operable to select a block of quantizers based on the selected intra prediction mode from the plurality blocks of quantizers; a quantization unit operable to perform quantization process on the block of transform coefficients using the selected block of quantizers to obtain a block of quantized transform coefficients; a scanning unit operable to perform scanning process on the block of quantized transform coefficients to obtain an array of quantized transform coefficients; an entropy encoding unit operable to perform entropy encoding.

Further, for example, an apparatus according to an exemplary embodiment of the present disclosure may be an apparatus of decoding video using intra prediction mode dependent quantization matrix comprising of: a parsing unit operable to parse a header of a compressed video stream to obtain a plurality blocks of quantizers; a parsing unit operable to parse a header of a coding unit of compressed stream to obtain a selection parameter to select one intra prediction mode from a plurality of predefined intra prediction modes; an entropy decoding unit operable to perform entropy decoding to obtain an array of quantized transform coefficients; an inverse scanning unit operable to perform inverse scanning process on the array of quantized transform coefficients to obtain a block of quantized transform coefficients; a selection unit operable to select one block of quantizers based on the parsed intra prediction mode from the plurality blocks of quantizers; an inverse quantization unit operable to perform inverse quantization process on the block of quantized transform coefficients using the selected block of quantizers to obtain a block of reconstructed transform coefficients; an inverse transform unit operable to perform inverse transform process on the block of reconstructed transform coefficients to obtain a block of reconstructed residuals; an intra prediction unit operable to perform intra prediction process based on the parsed intra prediction mode.

Furthermore, these general and specific embodiments may be implemented using an apparatus, a system, an integrated circuit, a computer program, or a non-transitory computer-readable recording medium such as a CD-ROM, or any combination of apparatuses, systems, integrated circuits, computer programs, or recording media.

The effects of the current disclosure are in the form of improvement in subjective picture quality.

The following is a detailed description of a method according to exemplary embodiments of the present disclosure using drawings. Each of the exemplary embodiments described below shows a general or specific example. The numerical values, shapes, materials, constituent elements, the arrangement and connection of the constituent elements, steps, the processing order of the steps, and the like shown in the following exemplary embodiments are mere examples, and therefore do not limit the inventive concept, the scope of which is defined in the appended Claims and their equivalents. Therefore, among the constituent elements in the following exemplary embodiments, constituent elements not recited in any of the independent claims defining the most generic part of the inventive concept are described as arbitrary constituent elements.

Embodiment 1

FIG. 1 shows a flowchart showing an encoding process in Embodiment 1. Firstly in module 100, an array of quantizers for each size of block unit is calculated based on the predefined quantization matrix. Examples of block unit size include 4×4, 8×8, 16×16 and 32×32 block unit sizes. Example of an array of quantizers is composed of at least two different quantizers.

Quantization matrix is predefined to contain different scalars for transform coefficients on different frequency positions in a transform unit. When a quantization parameter is defined by the encoder, each quantizer can be calculated from the quantization parameter and the corresponding scalar at the same position in the quantization matrix. Then, quantizers are directly used to quantize the transform coefficients.

In module 102, all the arrays containing a plurality of quantizers are encoded into header of compressed video stream as part of Sequence Parameter Set or part of Picture Parameter Set. And in module 104, one intra prediction mode is selected among a plurality of intra prediction modes for the following intra prediction process. Accordingly, an intra prediction process is performed based on the selected intra prediction mode to produce a block of prediction samples in module 106.

Next in module 108, a block of residuals is computed from subtracting a block of image samples with the block of prediction samples obtained in module 106. In module 110, a transform process is performed on the block of residuals to produce a block of transform coefficients. In the following module 112, one scanning order is selected among a plurality of scanning orders based on the selected intra prediction mode in module 104. In module 114, the array of quantizers for this block unit is scanned based on the selected scanning order in module 112 to produce a block of quantizers. Three examples are shown in FIG. 15. As shown in FIG. 15, practically, each intra prediction mode may correspond with its own scanning order, or a group of intra prediction modes may share the same scanning order.

In module 116, a quantization process is performed on the block of transform coefficients to produce a block of quantized transform coefficients. In module 118, the block of quantized transform coefficients obtained in module 116 is scanned to produce an array of quantized transform coefficients. Finally, the array of quantized transform coefficients are entropy encoded in module 120.

FIG. 2 shows a flowchart showing a decoding process in Embodiment 1. Firstly in module 200, a header of a compressed video stream is parsed to obtain an array of quantizers for each size of block unit. In module 202, one intra prediction mode is selected among a plurality of intra prediction modes based on the selection parameter parsed from a header of a coding unit of compressed video stream. Following in module 204, entropy decoding is performed to obtain an array of quantized transform coefficients.

Next in module 206, inverse scanning process is performed on the array of quantized transform coefficients to obtain a block of quantized transform coefficients. In module 208, another scanning order is selected from a plurality of scanning orders based on the parsed intra prediction mode in module 202. Subsequently, the array of quantizers parsed in module 200 is scanned to produce a block of quantizers in module 210.

In module 212, inverse quantization process is performed on the block of quantized transform coefficients using the block of quantizers to produce a block of reconstructed transform coefficients. In module 214, inverse transform is performed on the block of reconstructed transform coefficients to produce a block of reconstructed residuals. In module 216, intra prediction process is performed based on the intra prediction mode in module 202.

Embodiment 2

FIG. 3 shows a flowchart showing an encoding process in Embodiment 2. Firstly in module 300, an array of quantizers for each size of block unit is calculated based on the predefined quantization matrix. Examples of block unit size include 4×4, 8×8, 16×16 and 32×32 block unit sizes. Example of an array of quantizers is composed of at least two different quantizers.

Quantization matrix is predefined to contain different scalars for transform coefficients on different frequency positions in a transform unit. When a quantization parameter is defined by the encoder, each quantizer can be calculated from the quantization parameter and the corresponding scalar at the same position in the quantization matrix. Then, quantizers are directly used to quantize the transform coefficients.

In module 302, all the arrays containing a plurality of quantizers are encoded into header of compressed video stream as part of Sequence Parameter Set or part of Picture Parameter Set. And in module 304, one intra prediction mode is selected among a plurality of intra prediction modes for the following intra prediction process. Accordingly, an intra prediction process is performed based on the above selected intra prediction mode to produce a block of prediction samples in module 306.

Next in module 308, the block of residuals is computed from subtracting a block of image samples with a block of prediction samples obtained in module 306. In module 310, a transform process is performed on the block of residuals to produce a block of transform coefficients. In the following module 312, one scanning order is selected among a plurality of scanning orders based on the selected intra prediction mode in module 304. In module 314, a scanning process is performed on the block of transform coefficients to produce an array of transform coefficients. Three examples are shown in FIG. 16. As shown in FIG. 16, practically, each intra prediction mode may correspond with its own scanning order, or a group of intra prediction modes may share the same scanning order.

In the following module 316, a quantization process is performed on the array of transform coefficients using the array of quantizers to obtain an array of quantized transform coefficients. Finally, the array of quantized transform coefficients are entropy encoded in module 318.

FIG. 4 shows a flowchart showing a decoding process in Embodiment 2. Firstly in module 400, a header of a compressed video stream is parsed to obtain an array of quantizers for each size of block unit. In module 402, one intra prediction mode is selected among a plurality of intra prediction modes based on the selection parameter parsed from a header of a coding unit of compressed video stream. Following in module 404, entropy decoding is performed to obtain an array of quantized transform coefficients.

In module 406, inverse quantization is performed on the array of quantized transform coefficients to produce an array of reconstructed transform coefficients. In module 408, based on the intra prediction mode parsed in module 402, one scanning order is selected from a plurality of scanning orders. In module 410, inverse scanning process is performed on the array of reconstructed transform coefficients to produce a block of reconstructed transform coefficients. In module 412, inverse transform is performed on the block of reconstructed transform coefficients to produce a block of reconstructed residuals. Finally, in module 414, intra prediction process is performed based on the parsed intra prediction mode in module 402.

Embodiment 3

FIG. 5 shows a flowchart showing an encoding process in Embodiment 3. Firstly, in module 500 a plurality of blocks containing multiple quantizers is calculated for each size of block unit based on the predefined quantization matrixes. Example of a block of quantizers is composed of at least two different quantizers. For example, block unit size could be 4×4, 8×8, 16×16, and 32×32. Each size of block unit has multiple blocks of quantizers.

Quantization matrix is predefined to contain different scalars for transform coefficients on different frequency positions in a transform unit. When a quantization parameter is defined by the encoder, each quantizer can be calculated from the quantization parameter and the corresponding scalar at the same position in the quantization matrix. Then, quantizers are directly used to quantize the transform coefficients.

In module 502, the blocks of quantizers calculated in module 500 are encoded into header of a compressed video stream as part of sequence parameter set (SPS) or part of picture parameter set (PPS). In module 504, an intra prediction mode is selected among a plurality of intra prediction modes. In module 506, an intra prediction process is performed based on the intra prediction mode selected in module 504 to produce a block of prediction samples.

Next in module 508, a block of original samples are subtracted based on the block of prediction samples to produce a block of residuals. In module 510, a transform process is performed on the block of residuals to produce a block of transform coefficients. In module 512, a block of quantizers is selected among a plurality of blocks of quantizers based on the selected intra prediction mode in module 504. In module 514, a quantization process is performed on the block of transform coefficients to produce a block of quantized transform coefficients. In module 516, a scanning process is performed on the block of quantized transform coefficients to produce an array of quantized transform coefficients. In module 518, the array of quantized transform coefficients are entropy encoded.

FIG. 6 shows a flowchart showing a decoding process in Embodiment 3. Firstly in module 600, a header of a compressed video stream is parsed to obtain an array of quantizers for each size of block unit. For example, the header of compressed video stream could be SPS or PPS. In module 602, a header of a coding block unit of compressed stream is parsed to obtain a selection parameter. Then, one intra prediction mode is accordingly selected from a plurality of intra prediction modes. In module 604, entropy decoding is performed to produce an array of quantized transform coefficients. In module 606, inverse scanning process is performed on the array of quantized transform coefficients to produce a block of quantized transform coefficients. In module 608, one block of quantizers is selected from a plurality of blocks of quantizers based on the intra prediction mode selected in module 602.

Next in module 610, an inverse quantization process in performed on the block of quantized transform coefficients to produce a block of reconstructed transform coefficients using the selected block of quantizers. In module 612, inverse transform process is performed on the block of reconstructed transform coefficients to produce a block of reconstructed residuals. Finally, in module 614, intra prediction process is performed based on the intra prediction mode parse in module 602.

FIG. 7 is a block diagram illustrating an example apparatus for a video encoder in Embodiment 1 and Embodiment 3. The apparatus in FIG. 7 includes a subtractor 700, a transform unit 702, a quantization unit 704, a scanning unit 706, an entropy coding unit 708, an inverse quantization unit 710, an inverse transform unit 712, an adder 714, a filtering unit 716, a memory 718, a motion estimation unit 720, a motion compensation unit 722, a quantizer determination unit 724, a selector 726, an intra prediction unit 728, an intra prediction direction selection unit 730, and a memory 732.

For example, the entropy coding unit 708 corresponds to module 100, module 102, module 120, module 500, module 502 and module 518. And the intra prediction direction selection unit 730 corresponds to module 104 and module 504. And the intra prediction unit 728 corresponds to module 106 and module 506. And the subtractor 700 corresponds to module 108 and module 508. And the transform unit 702 corresponds to module 110 and module 510. And the quantizer determination unit 724 corresponds to module 112, module 114, and module 512. And the quantization unit 704 corresponds to module 116 and module 514. And the scanning unit 706 corresponds to module 118 and module 516.

FIG. 8 is a block diagram illustrating an example apparatus for a video decoder in Embodiment 1 and Embodiment 3. The apparatus in FIG. 8 includes a parser unit 800, an entropy decoding unit 802, a quantizer determination unit 804, an inverse scanning unit 806, an inverse quantization unit 808, an inverse transform unit 810, an adder 812, a filtering unit 814, a selector 816, an intra prediction unit 818, a memory 820, a memory 822, a motion compensation 824 and a parser unit 826.

For example, the parser unit 800 corresponds to module 200 and module 600. And the parser unit 826 corresponds to module 202 and module 602. And the entropy decoding unit 802 corresponds to module 204 and module 604. And the inverse scanning unit 806 corresponds to module 206 and module 606. And the quantizer determination unit 804 corresponds to module 208, module 210, and module 608. And the inverse quantization unit 808 corresponds to module 212 and module 610. And the inverse transform unit 810 corresponds to module 214 and module 612. And the intra prediction unit 818 corresponds to module 216 and module 614.

FIG. 9 is a block diagram illustrating an example apparatus for a video encoder in Embodiment 2. The apparatus in FIG. 9 includes a subtractor 900, a transform unit 902, a scanning unit 904, a quantization unit 906, an entropy coding unit 908, an inverse quantization unit 910, an inverse scanning unit 912, an inverse transform unit 914, a quantizer memory 916, a scanning order selection unit 918, an adder 920, a filtering unit 922, a memory 924, a motion estimation unit, a motion compensation unit 928, a selector 930, an intra prediction unit 932, an intra prediction direction selection unit 934 and a memory 936.

For example, the entropy coding unit 908 corresponds to module 300, module 302 and module 318. And the intra prediction direction selection unit 934 corresponds to module 304. And the intra prediction unit 932 corresponds to module 306. And the subtractor 900 corresponds to module 308. And the transform unit 902 corresponds to module 310. And the scanning order selection unit 918 corresponds to module 312. And the scanning unit 904 corresponds to module 314. And the quantization unit 906 corresponds to module 316.

FIG. 10 is a block diagram illustrating an example apparatus for a video decoder in Embodiment 2. The apparatus in FIG. 10 includes an entropy decoding unit 1000, an inverse quantization unit 1002, an inverse scanning unit 1004, an inverse scanning order selection unit 1006, an inverse transform unit 1008, an adder 1010, a filtering unit 1012, a memory 1014, a selector 1016, a memory 1018, a motion compensation unit 1020, a intra prediction unit 1022, a quantizer memory 1024, a parser unit 1026, a intra prediction mode memory 1028 and a parser unit 1030.

For example, the parser unit 1030 corresponds to module 400. And the parser unit 1026 corresponds to module 402. And the entropy decoding unit 1000 corresponds to module 404. And the inverse quantization unit 1002 corresponds to module 406. And the inverse scanning order selection unit 1006 corresponds to module 408. And the inverse scanning unit 1004 corresponds to module 410. And the inverse transform unit 1008 corresponds to module 412. And the intra prediction unit 1022 corresponds to module 414.

FIG. 11 is a diagram showing the locations of a plurality of quantizers in a header of a sequence, where each TU size corresponds with a single quantization matrix. FIG. 12 is a diagram showing the locations of a plurality of quantizers in a header of an image, where each TU size corresponds with a single quantization matrix. FIG. 13 is a diagram showing the locations of a plurality of quantizer arrays in a header of a sequence, where each TU size corresponds with a plurality of quantization matrix. FIG. 14 is a diagram showing the locations of a plurality of quantizer arrays in a header of an image, where each TU size corresponds with a plurality of quantization matrix.

Intra prediction mode dependent adaptive quantization matrix is to improve the utilization of quantization matrix. This disclosure could adaptively adjust the quantization matrix based on the intra prediction mode for different block units. Therefore, it does not introduce additional overheads for selection of quantization matrix. In addition, this disclosure proposes two solutions that only a single quantization matrix is required for a block unit. In this case, memory is saved for storing the quantization matrix. The benefits of the current disclosure are in the form of improving subjective visual quality.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which realizes the apparatus in the above embodiments and the like is a program as will be described below.

Specifically, this program causes a computer to execute a method of encoding video using intra prediction mode dependent quantization matrix comprising of: calculating an array of quantizers for each size of block unit; encoding the arrays of quantizers into header of compressed video stream; selecting one intra prediction mode from a plurality of intra prediction modes; performing an intra prediction process based on the selected intra prediction mode to get a block of prediction samples; subtracting a block of original samples from the block of prediction samples to obtain a block of residuals; performing a transform process on the block of residuals to produce a block of transform coefficients; selecting one scanning order based on the selected intra prediction mode among a plurality of scanning orders; scanning the array of quantizers to obtain a block of quantizers based on the selected scanning order; performing quantization process on the block of transform coefficients to obtain a block of quantized transform coefficients; performing a scanning process on the block of quantized transform coefficients to obtain an array of quantized transform coefficients; performing entropy coding on the array of quantized transform coefficients.

The above is a description of a method according to one or more aspects of the inventive concept, the scope of which is defined in the appended Claims and their equivalents, based on some exemplary embodiments. However, the inventive concept is not limited to these exemplary embodiments. Those skilled in the art will readily appreciate that it is possible to make various modifications in these exemplary embodiments and to arbitrarily combine the constituent elements in the exemplary embodiments without materially departing from the principles and spirit of the inventive concept.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Furthermore, FIG. 30 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by intra prediction processing in particular, for example, the dedicated decoding processing unit ex901 is used for intra prediction processing. Otherwise, the decoding processing unit is probably shared for one of the entropy decoding, inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 35B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The method according to an aspect of the present disclosure is applicable to, for example, television receivers, digital video recorders, car navigation systems, cellular phones, digital cameras, and digital video cameras.

REFERENCE SIGNS LIST 700, 900 Subtractor
702, 902 Transform Unit
704, 906 Quantization Unit
706, 904 Scanning Unit
708, 908 Entropy Coding Unit
710, 808, 910, 1002 Inverse Quantization Unit
712, 810, 914, 1008 Inverse Transform Unit
714, 812, 920, 1010 Adder
716, 814, 922, 1012 Filtering Unit
718, 732, 820, 822, 924, 936, 1014, 1018 Memory
720, 926 Motion Estimation Unit
722, 824, 928, 1020 Motion Compensation Unit
724, 804 Quantizer Determination Unit
726, 816, 930, 1016 Selector
728, 818, 932, 1022 Intra Prediction Unit
730, 934 Intra Prediction Direction Selection Unit
800, 826, 1026, 1030 Parser Unit
802, 1000 Entropy Decoding Unit
806, 912, 1004 Inverse Scanning Unit
916, 1024 Quantizer Memory
918 Scanning Order Selection Unit
1006 Inverse Scanning Order Selection Unit
1028 Intra Prediction Mode Memory

The invention claimed is:

1. A method of encoding video using intra prediction mode dependent quantization matrix comprising:
calculating an array of quantizers for each size of block unit;
encoding the arrays of quantizers into header of compressed video stream;
selecting one intra prediction mode from a plurality of intra prediction modes;
performing an intra prediction process based on the selected intra prediction mode to get a block of prediction samples;
subtracting a block of original samples from the block of prediction samples to obtain a block of residuals;
performing a transform process on the block of residuals to produce a block of transform coefficients;
selecting one scanning order based on the selected intra prediction mode among a plurality of scanning orders;
scanning the array of quantizers to obtain a block of quantizers based on the selected scanning order;
performing a quantization process on the block of transform coefficients using the block of quantizers to obtain a block of quantized transform coefficients;
performing a scanning process on the block of quantized transform coefficients to obtain an array of quantized transform coefficients; and
performing entropy coding on the array of quantized transform coefficients, wherein
in the performing an intra prediction process, the intra prediction process is performed according to a first direction based on the selected intra prediction mode, and
in the selecting one scanning order, the selected scanning order is selected such that, in the scanning the array of quantizers, the array of quantizers are scanned according to a second direction based on the selected scanning order, the second direction being perpendicular to the first direction.

2. The method according to claim 1, wherein
in the selecting of one scanning order:
when the first direction is a vertical direction, the selected scanning order is selected such that, in the scanning the array of quantizers, the array of quantizers are scanned according a horizontal direction based on the selected scanning order;
when the first direction is the horizontal direction, the selected scanning order is selected such that, in the scanning the array of quantizers, the array of quantizers are scanned according the vertical direction based on the selected scanning order; and
when the first direction is a diagonal direction, the selected scanning order is selected such that, in the scanning the array of quantizers, the array of quantizers are scanned according a zig-zag direction based on the selected scanning order.

3. A method of decoding video using intra prediction mode dependent quantization matrix comprising:
parsing a header of compressed video stream to obtain an array of quantizers for a block unit;
parsing a header of a coding unit of compressed video stream to obtain a selection parameter to select one intra prediction mode from a plurality of predefined intra prediction modes;
performing entropy decoding to obtain an array of quantized transform coefficients;
performing an inverse scanning process on the array of quantized transform coefficients to obtain a block of quantized transform coefficients;
selecting one scanning order from a plurality of scanning orders based on the parsed intra prediction mode;
scanning the array of quantizers to obtain a block of quantizers based on the selected scanning order;
performing an inverse quantization process on the block of quantized transform coefficients using the block of quantizers to obtain a block of reconstructed transform coefficients;
performing an inverse transform on the block of transform coefficients to obtain a block of reconstructed residuals; and
performing an intra prediction process based on the parsed intra prediction mode, wherein
in the performing an intra prediction process, the intra prediction process is performed according to a first direction based on the parsed intra prediction mode, and
in the selecting one scanning order, the selected scanning order is selected such that, in the scanning the array of quantizers, the array of quantizers are scanned according to a second direction based on the selected scanning order, the second direction being perpendicular to the first direction.

4. The method according to claim 3, wherein
in the selecting of one scanning order:
when the first direction is a vertical direction, the selected scanning order is selected such that, in the scanning the array of quantizers, the array of quantizers are scanned according a horizontal direction based on the selected scanning order, the second direction being perpendicular to the first direction;

when the first direction is the horizontal direction, the selected scanning order is selected such that, in the scanning the array of quantizers, the array of quantizers are scanned according the vertical direction based on the selected scanning order, the second direction being perpendicular to the first direction; and when the first direction is a diagonal direction, the selected scanning order is selected such that, in the scanning the array of quantizers, the array of quantizers are scanned according a zig-zag direction based on the selected scanning order, the second direction being perpendicular to the first direction.

5. An apparatus for encoding video using intra prediction mode dependent quantization matrix comprising:

a calculating unit operable to determine an array of quantizers for each size of block unit;

an encoding unit operable to encode the arrays of quantizers into header of compressed video stream;

a first selection unit operable to select one intra prediction mode from a plurality of intra prediction modes;

an intra prediction unit operable to perform an intra prediction process based on the selected intra prediction mode to get a block of prediction samples;

a subtraction unit operable to subtract a block of original samples from the block of prediction samples to obtain a block of residuals;

a transform unit operable to perform a transform process on the block of residuals to produce a block of transform coefficients;

a second selection unit operable to select one scanning order based on the selected intra prediction mode among a plurality of scanning orders;

a first scanning unit operable to scan the array of quantizers to obtain a block of quantizers based on the selected scanning order;

a quantization unit operable to perform a quantization process on the block of transform coefficients using the block of quantizers to obtain a block of quantized transform coefficients;

a second scanning unit operable to perform a scanning process on the block of quantized transform coefficients to obtain an array of quantized transform coefficients; and an entropy coding unit operable to perform entropy coding on the array of quantized transform coefficients, wherein the intra prediction unit performs the intra prediction process according to a first direction based on the selected intra prediction mode, and the second selection unit selects the selected scanning order such that the first scanning unit scans the array of quantizers according to a second direction based on the selected scanning order, the second direction being perpendicular to the first direction.

6. The apparatus according to claim 5, wherein when the first direction is a vertical direction, the second selection unit selects the selected scanning order such that the first scanning unit scans the array of quantizers according a horizontal direction based on the selected scanning order, when the first direction is the horizontal direction, the second selection unit selects the selected scanning order such that the first scanning unit scans the array of quantizers according the vertical direction based on the selected scanning order, and when the first direction is a diagonal direction, the second selection unit selects the selected scanning order such that the first scanning unit scans the array of quantizers according a zig-zag direction based on the selected scanning order.

7. An apparatus for decoding video using intra prediction mode dependent quantization matrix comprising:

a first parsing unit operable to parse a header of compressed video stream to obtain an array of quantizers for a block unit;

a second parsing unit operable to parse a header of a coding unit of compressed video stream to obtain a selection parameter to select one intra prediction mode from a plurality of predefined intra prediction modes;

an entropy decoding unit operable to perform entropy decoding to obtain an array of quantized transform coefficients;

an inverse scanning unit operable to perform inverse scanning process on the array of quantized transform coefficients to obtain a block of quantized transform coefficients;

a scanning selection unit operable to select one scanning order from a plurality of scanning orders based on the parsed intra prediction mode;

a scanning unit operable to scan the array of quantizers to obtain a block of quantizers based on the selected scanning order;

an inverse quantization unit operable to perform an inverse quantization process on the block of quantized transform coefficients using the block of quantizers to obtain a block of reconstructed transform coefficients;

an inverse transform unit operable to perform an inverse transform on the block of transform coefficients to obtain a block of reconstructed residuals; and an intra prediction unit operable to perform an intra prediction process based on the parsed intra prediction mode, wherein the intra prediction unit performs the intra prediction process according to a first direction based on the parsed intra prediction mode, and the scanning selection unit selects the selected scanning order such that the scanning unit scans the array of quantizers according to a second direction based on the selected scanning order, the second direction being perpendicular to the first direction.

8. The apparatus according to claim 7, wherein when the first direction is a vertical direction, the scanning selection unit selects the selected scanning order such that the scanning unit scans the array of quantizers according a horizontal direction based on the selected scanning order, when the first direction is the horizontal direction, the scanning selection unit selects the selected scanning order such that the scanning unit scans the array of quantizers according the vertical direction based on the selected scanning order, and when the first direction is a diagonal direction, the scanning selection unit selects the selected scanning order such that the scanning unit scans the array of quantizers according a zig-zag direction based on the selected scanning order.

* * * * *